United States Patent
Koo

(10) Patent No.: US 11,277,640 B2
(45) Date of Patent: Mar. 15, 2022

(54) METHOD AND APPARATUS FOR CONFIGURING TRANSFORM FOR VIDEO COMPRESSION

(71) Applicant: LG Electronics Inc., Seoul (KR)

(72) Inventor: Moonmo Koo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/781,416

(22) Filed: Feb. 4, 2020

(65) Prior Publication Data
US 2020/0177921 A1    Jun. 4, 2020

Related U.S. Application Data

(63) Continuation of application No. PCT/KR2018/008907, filed on Aug. 6, 2018.
(Continued)

(51) Int. Cl.
*H04N 19/61* (2014.01)
*H04N 19/12* (2014.01)
(Continued)

(52) U.S. Cl.
CPC ......... *H04N 19/625* (2014.11); *H04N 19/122* (2014.11); *H04N 19/176* (2014.11); *H04N 19/61* (2014.11)

(58) Field of Classification Search
CPC .. H04N 19/176; H04N 19/122; H04N 19/625; H04N 19/61
(Continued)

(56) References Cited

U.S. PATENT DOCUMENTS 10,491,922 B2 * 11/2019 Zhao ............... H04N 19/159
11,070,806 B2 *  7/2021 Lee .................. H04N 19/12
(Continued)

FOREIGN PATENT DOCUMENTS

CN    103098473    5/2013
CN    104378633    2/2015
(Continued)

OTHER PUBLICATIONS

Chen, "Algorithm Description of Joint Exploration Test Model 3", May 26, 2016, JVET (Year: 2016).*
(Continued)

*Primary Examiner* — Albert Kir
(74) *Attorney, Agent, or Firm* — Fish & Richardson P.C.

(57) ABSTRACT

The present disclosure relates to a method for decoding a video signal based on adaptive multiple transforms (AMT). The method includes: obtaining an AMT index from the video signal, where the AMT index indicates any one of a plurality of transform combinations in a transform configuration group, and the transform configuration group includes discrete sine transform type 7 (DST7) and discrete cosine transform type 8 (DCT8): deriving a transform combination corresponding to the AMT index, where the transform combination includes a horizontal transform and a vertical transform, and at least one of the DST-7 or the DCT-8: performing an inverse transform on a current block on the basis of the transform combination; and restoring the video signal by using the inversely transformed current block. The AMT represents a transform scheme that is performed based on a transform combination adaptively selected from a plurality of transform combinations.

8 Claims, 19 Drawing Sheets

Related U.S. Application Data

(60) Provisional application No. 62/541,103, filed on Aug. 4, 2017.

(51) Int. Cl.
  *H04N 19/176* (2014.01)
  *H04N 19/625* (2014.01)
  *H04N 19/122* (2014.01)

(58) Field of Classification Search
  USPC .............................. 375/240.18, 240.2, 240.3
  See application file for complete search history.

(56) References Cited

U.S. PATENT DOCUMENTS

| | | | |
|---|---|---|---|
| 11,146,816 B2* | 10/2021 | Koo | H04N 19/122 |
| 2016/0156934 A1 | 6/2016 | Lee et al. | |
| 2017/0094313 A1 | 3/2017 | Zhao et al. | |
| 2017/0188029 A1 | 6/2017 | An et al. | |
| 2018/0205949 A1 | 7/2018 | Hsiang | |
| 2018/0332289 A1* | 11/2018 | Huang | H04N 19/13 |
| 2019/0149845 A1* | 5/2019 | De Luxn Hernandez | H04N 19/625 375/240.18 |
| 2020/0213626 A1* | 7/2020 | Ikai | H04N 19/12 |
| 2021/0021870 A1* | 1/2021 | Tsukuba | H04N 19/463 |
| 2021/0120269 A1* | 4/2021 | Chen | H04N 19/14 |
| 2021/0144375 A1* | 5/2021 | Lee | H04N 19/124 |

FOREIGN PATENT DOCUMENTS

| | | |
|---|---|---|
| CN | 104620576 | 5/2015 |
| CN | 107211144 | 9/2017 |
| RU | 2595587 | 8/2016 |
| WO | WO2012033373 | 3/2012 |
| WO | WO2016082774 | 6/2016 |

OTHER PUBLICATIONS

Chen et al., "Algorithm Description of Joint Exploration Test Model 3," JVET-C1001_v1, Preliminary version of Output Document to JVET, Joint Video Exploration Team (JVET) of ITU-T SG 16 WP 3 and ISO/IEC JTC 1/SC 29/WG 11, Geneva, CH, dated May 26-Jun. 1, 2016, 36 pages.

Chen et al., "Algorithm Description of Joint Exploration Test Model 7 (JEM 7)," JVET-G1001-v1, Algorithm Description of Joint Exploration Test Model 7, Joint Video Exploration Team (JVET) of ITU-T SG 16 WP 3 and ISO/IEC JTC 1/SC 29/WG 11, Torino, IT, dated Jul. 13-21, 2017, 49 pages.

$3^{rd}$ Generation Partnership Project; bcom, Orange, TDF, Qualcomm; "EE2: Adaptive Primary Transform improvement," JVET-D0065, ITU TSG 16WP3, Chengdu, China, dated Oct. 2016, 7 pages.

3rd Generation Partnership Project; Editors; "Algorithm Description of Joint Exploration Test Model 5 (JEM 5)," JVET-E1001-v2, ITU TSG 16 WP3, Geneva, dated Jan. 2017, 44 pages.

3rd Generation Partnership Project; LG Electronics; "CE 6-1.11: AMT replacement and restriction," JVET-K0096, ITU SG 16 WP3, Ljubljana, Slovenia, dated Jul. 2018, 11 pages.

3rd Generation Partnership Project: MediaTek, Inc.; "CE6.1.10 & CE6.3.4: AMT simplification and improvement," JVET-K0250-v1, ITU TSG 16 WP3, Ljubljana, Slovenia, dated Jul. 2018, 10 pages.

3rd Generation Partnership Project; TDF, bcom, Orange; "Adaptive Transform Sets for Inter Coding," JVET-D0070, ITU TSG 16 WP3, Chengdu, China, Oct. 2016, 6 pages.

Extended European Search Report in European Appln. No. 18842329.7, dated Mar. 30, 2020, 10 pages.

RU Office Action in Russian Appln. No. 2020109334, dated Aug. 18, 2020, 15 pages (with English translation).

CN Office Action in Chinese Appln. No. 201880065218.1, dated Jun. 29, 2021, 16 pages (with English translation).

Office Action in Indian Appln. No. 202027006634, dated Aug. 23, 2021, 8 pages (with English translation).

* cited by examiner

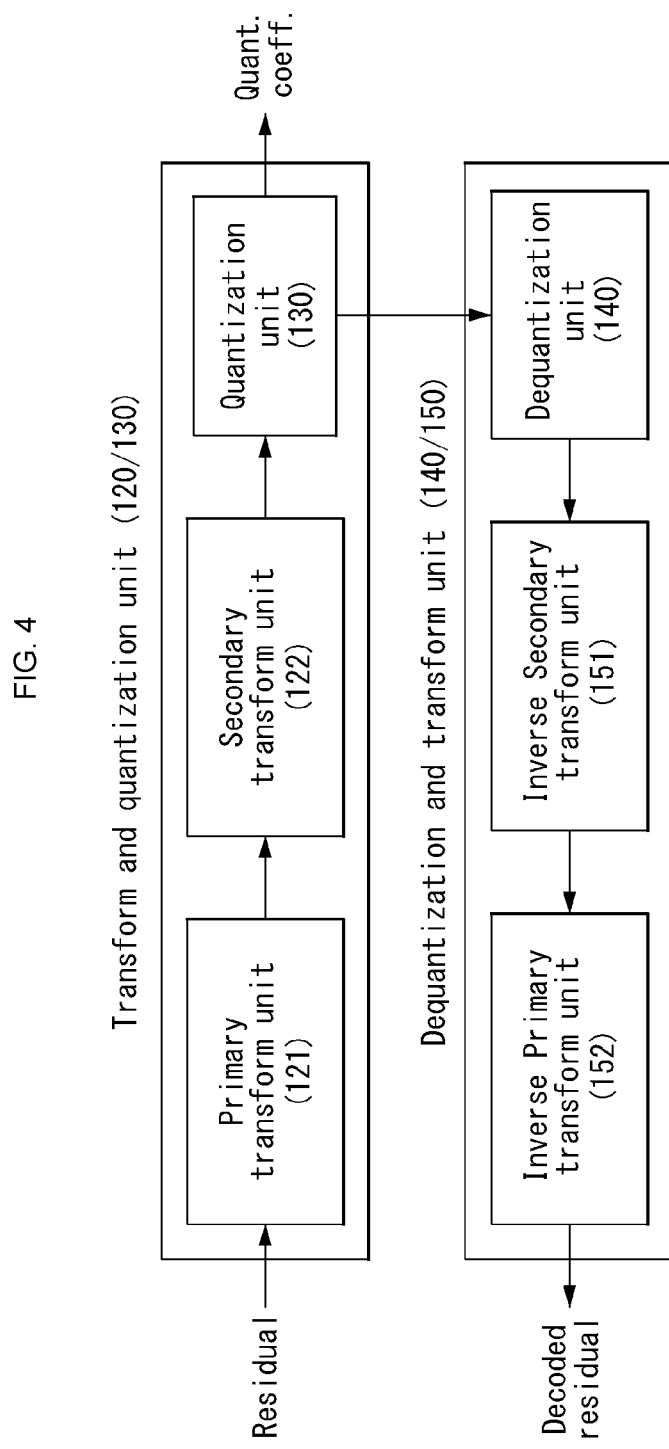

FIG. 6

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT5 | | |
| | 3 | DCT5 | DCT5 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

FIG. 12

| Configuration group | | Horizontal (row) transform Configuration | Vertical (column) transform Configuration |
|---|---|---|---|
| Group 0 ($G_0$) | 0 | $H(G_0, 0)$ | $V(G_0, 0)$ |
| | 1 | $H(G_0, 1)$ | $V(G_0, 1)$ |
| | ... | ... | ... |
| | $n_{G_0} - 1$ | $H(G_0, n_{G_0}-1)$ | $V(G_0, n_{G_0}-1)$ |
| Group 1 ($G_1$) | 0 | $H(G_1, 0)$ | $V(G_1, 0)$ |
| | 1 | $H(G_1, 1)$ | $V(G_1, 1)$ |
| | ... | ... | ... |
| | $n_{G_1} - 1$ | $H(G_1, n_{G_1}-1)$ | $V(G_1, n_{G_1}-1)$ |
| ... | ... | ... | ... |
| Group L-1 ($G_{L-1}$) | 0 | $H(G_{L-1}, 0)$ | $V(G_{L-1}, 0)$ |
| | 1 | $H(G_{L-1}, 1)$ | $V(G_{L-1}, 1)$ |
| | ... | ... | ... |
| | $n_{G_{L-1}} - 1$ | $H(G_{L-1}, n_{G_{L-1}}-1)$ | $V(G_{L-1}, n_{G_{L-1}}-1)$ |

FIG. 13

| 4 x 4 Horizontal transform Configuration group | | Horizontal (row) transform Configuration |
|---|---|---|
| Horiz. Group 0 ($HG_0^4$) | 0 | $H(HG_0^4, 0)$ |
| | 1 | $H(HG_0^4, 1)$ |
| | ... | ... |
| | $n_{HG_0^4} - 1$ | $H(HG_0^4, n_{HG_0^4} - 1)$ |
| Horiz. Group 1 ($HG_1^4$) | 0 | $H(HG_1^4, 0)$ |
| | 1 | $H(HG_1^4, 1)$ |
| | ... | ... |
| | $n_{HG_1^4} - 1$ | $H(HG_1^4, n_{HG_1^4} - 1)$ |
| ... | ... | ... |
| Horiz. Group L-1 ($HG_{L-1}^4$) | 0 | $H(HG_{L-1}^4, 0)$ |
| | 1 | $H(HG_{L-1}^4, 1)$ |
| | ... | ... |
| | $n_{HG_{L-1}^4} - 1$ | $H(HG_{L-1}^4, n_{HG_{L-1}^4} - 1)$ |

FIG. 14

| 4 x 4 Vertical transform Configuration group | | Vertical (column) transform Configuration |
|---|---|---|
| Vert. Group 0 ($VG_0^4$) | 0 | $H(VG_0^4, 0)$ |
| | 1 | $H(VG_0^4, 1)$ |
| | ... | ... |
| | $n_{VG_0^4} - 1$ | $H(VG_0^4, n_{VC_0^4} - 1)$ |
| Vert. Group 1 ($VG_1^4$) | 0 | $H(VG_1^4, 0)$ |
| | 1 | $H(VG_1^4, 1)$ |
| | ... | ... |
| | $n_{VG_1^4} - 1$ | $H(VG_1^4, n_{VC_1^4} - 1)$ |
| ... | ... | ... |
| Vert. Group L-1 ($VG_{L-1}^4$) | 0 | $H(VG_{L-1}^4, 0)$ |
| | 1 | $H(VG_{L-1}^4, 1)$ |
| | ... | ... |
| | $n_{VG_{L-1}^4} - 1$ | $H(VG_{L-1}^4, n_{VG_{L-1}^4} - 1)$ |

FIG. 15

| Mode group | | Horizontal (row) transform | Vertical (column) transform | Prediction modes |
|---|---|---|---|---|
| Group 0 ($G_0$) | 0 | $S_\bullet^{VII}$ | $S_\bullet^{VII}$ | Intra prediction |
| | 1 | $S_\bullet^{VII,R}$ | $S_\bullet^{VII}$ | |
| | 2 | $S_\bullet^{VII}$ | $S_\bullet^{VII,R}$ | |
| | 3 | $S_\bullet^{VII,R}$ | $S_\bullet^{VII,R}$ | |
| Group 1 ($G_1$) | 0 | $S_\bullet^{VII,R}$ | $S_\bullet^{VII,R}$ | Inter prediction |
| | 1 | $S_\bullet^{VII}$ | $S_\bullet^{VII,R}$ | |
| | 2 | $S_\bullet^{VII,R}$ | $S_\bullet^{VII}$ | |
| | 3 | $S_\bullet^{VII}$ | $S_\bullet^{VII}$ | |

FIG. 16

| Configuration group | | Horizontal (row) transform configuration | Vertical (column) transform Configuration |
|---|---|---|---|
| Group 0 ($G_0$) | 0 | ($S_4^{VII}, S_4^{VII}, S_4^{VII}, S_4^{VII}, S_4^{VII,R}, S_4^{VI,R}, C_4^{I}, C_4^{II}$) | ($S_8^{VII}, S_8^{VII}, S_8^{VII}, C_8^{II}$) |
| | 1 | ($S_4^{VII}, S_4^{VII}, S_4^{VII}, S_4^{VII,R}, S_4^{VII,R}, C_4^{II}, C_4^{II}, C_4^{I}$) | ($S_8^{VII}, S_8^{VII}, S_8^{VII,R}, C_8^{II}$) |
| | 2 | ($S_4^{VII}, S_4^{VII}, S_4^{VII,R}, S_4^{VII,R}, C_4^{II}, C_4^{II}, C_4^{II}, C_4^{I}$) | ($S_8^{VII}, S_8^{VII}, C_8^{II}, C_8^{II}$) |
| | 3 | ($S_4^{VII}, S_4^{VII,R}, C_4^{II}, C_4^{II}, C_4^{II}, C_4^{II}, C_4^{II}, C_4^{II}$) | ($S_8^{VII}, S_8^{VI,R}, C_8^{II}, C_8^{II}$) |
| ... | ... | ... | ... |

| Seed | Maximally spanned set composed of trigonometric transforms |
|---|---|
| {$C^{II}$ or $S^{II}$} | {$C^{II}$ or $S^{II}$} |
| {$C^{VII}$ or $S^{VII}$} | {$C^{VIII}$ or $S^{VIII}$} |
| {$C^{IV}$ or $S^{IV}$} | {$C^{IV}$ or $S^{IV}$} |
| {$C^{II}$ or $S^{II}$, $C^{VIII}$ or $S^{V}$ or $S^{VI}$ or $S^{VII}$} | {$C^{II}$, $C^{VIII}$, $S^{II}$, $S^{V}$, $S^{VI}$, $S^{VII}$} |
| {$C^{II}$ or $S^{II}$, $C^{IV}$ or $S^{IV}$} | {$C^{II}$, $S^{II}$, $C^{IV}$, $S^{IV}$} |

…

METHOD AND APPARATUS FOR CONFIGURING TRANSFORM FOR VIDEO COMPRESSION

CROSS-REFERENCE TO RELATED APPLICATIONS

This application is a continuation application of International Application No. PCT/KR2018/008907, filed on Aug. 6, 2018, which claims the benefit of U.S. Provisional Applications No. 62/541,103, filed on Aug. 4, 2017, the contents of which are all hereby incorporated by reference herein in their entirety.

TECHNICAL FIELD

The present disclosure relates to a method and apparatus for processing a video signal and, more particularly, to a technology for configuring a transform combination for each transform configuration group distinguished based on at least one of a prediction mode, a block size or a block shape.

BACKGROUND

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

SUMMARY

The disclosure is to design a more efficient transform configuration in terms of coding efficiency and complexity.

The disclosure is to propose a method of configuring a transform combination for each transform configuration group distinguished based on at least one of a prediction mode, a block size or a block shape.

Furthermore, the disclosure is to propose an encoder/decoder structure for incorporating a new transform design.

In order to accomplish the objects, the disclosure provides a method of substituting discrete cosine transform type 8 (DCT8) with a modified form of discrete sine transform type 7 (DST7) while using kernel coefficient data of the DST7 without any change.

Furthermore, the disclosure provides a method of substituting DST7 with DST4 and substituting DCT8 with a modified form of DCT4 while using kernel coefficient data of the DST4 without any change.

Furthermore, the disclosure provides a method of configuring transform configuration groups based on at least one of a prediction mode, a block size or a block shape and differently configuring a transform corresponding to each row or column, wherein one transform configuration group is configured with one or more transform combinations and one transform combination is configured with transforms corresponding to all rows and columns.

Furthermore, the disclosure provides a method of configuring transforms for all rows and columns based on one transform, such as DST7 or DST4, and a transform modified therefrom.

Furthermore, the disclosure provides a method of configuring a transform set which may be derived with respect to all transforms in such a way as to use linear relations between all trigonometric transforms (8 DCTs, 8 DSTs) or adding a post/pre-processing process to a transform input/output part, computing a union of the derived transform sets, and using the union to determine a transform combination.

The disclosure can generate transform coefficients having higher coding efficiency by configuring transforms for all rows and columns for each transform configuration group based on a predetermined number of transforms when a still image or a moving image is coded.

DESCRIPTION OF DRAWINGS

FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

FIG. 4 is an embodiment to which the disclosure is applied and illustrates a schematic block diagram of a transform and quantization unit 120/130 and a dequantization and transform unit 140/150 within an encoder.

FIG. 6 is an embodiment to which the disclosure is applied and is a table illustrating a transform configuration group to which adaptive multiple transforms (AMT) is applied.

FIG. 12 is an embodiment to which the disclosure is applied and is a diagram for describing a method of configuring a common transform configuration group based on at least one of a prediction mode, a block size or a block shape.

FIGS. 13 and 14 are embodiments to which the disclosure is applied and are tables for describing a method of dividing transform configuration groups into a plurality of tables based on at least one of a prediction mode, a block size or a block shape and combining the transform configuration groups.

FIG. 15 is an embodiment to which the disclosure is applied and illustrates an example in which a transform configuration group is configured using one transform set.

FIG. 16 is an embodiment to which the disclosure is applied and illustrates an example in which a transform configuration group is configured using different transform sets based on a transform block size.

DETAILED DESCRIPTION

Figure 1:
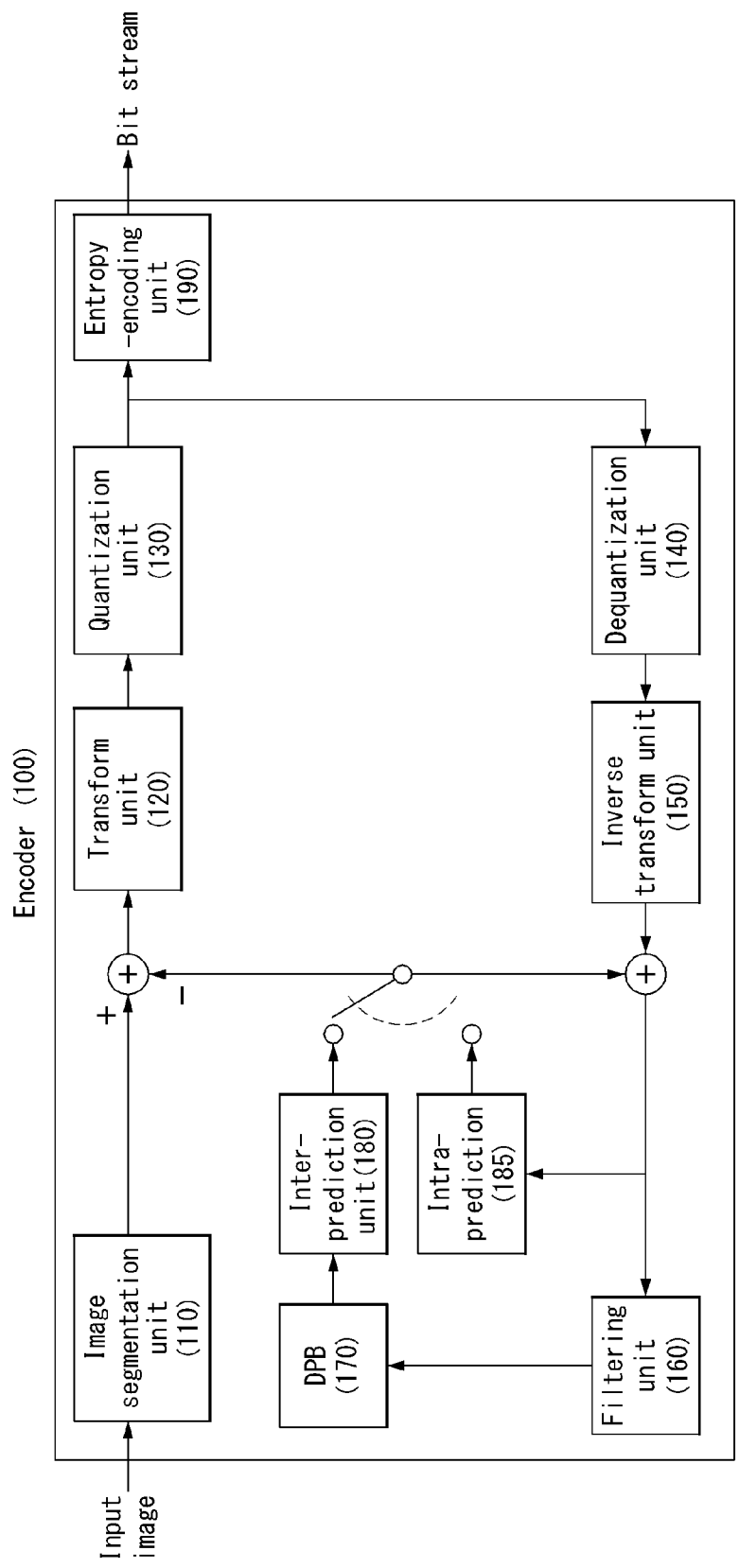
FIG. 1 is a block diagram illustrating the configuration of an encoder for encoding a video signal according to an embodiment of the present invention.

The disclosure provides a method of decoding a video signal based on adaptive multiple transforms (AMT), including obtaining an AMT index from the video signal, wherein the AMT index indicates any one of a plurality of transform combinations within a transform configuration group, and the transform configuration group includes discrete sine transform type 7 (DST7) and discrete cosine transform type 8 (DCT8), deriving a transform combination corresponding to the AMT index, wherein the transform combination is configured with a horizontal transform and a vertical transform and includes at least one of the DST-7 or the DCT-8, performing an inverse transform on a current block based on the transform combination, and reconstructing the video signal using the inverse-transformed current block, wherein the AMT indicates a transform method performed based on a transform combination adaptively selected from the plurality of transform combinations.

In the disclosure, the transform configuration group is configured based on at least one of a prediction mode, block size or block shape of the current block.

In the disclosure, the inverse transform is applied only when both a width and height of a transform unit are 32 or less.

In the disclosure, the method further includes obtaining an AMT flag from the video signal, wherein the AMT flag indicates whether the AMT is performed, and wherein the AMT index is obtained when an AMT is performed based on the AMT flag.

In the disclosure, the method further includes checking whether the number of non-zero transform coefficient is greater than a threshold if an AMT is performed based on the AMT flag, wherein the AMT index is obtained when the number of non-zero transform coefficient is greater than the threshold.

In the disclosure, performing the inverse transform includes applying an inverse transform of the DST-7 or an inverse transform of the DCT-8 to each row after applying the inverse transform of the DST-7 or the inverse transform of the DCT-8 to each column if the vertical transform or the horizontal transform is the DST-7 or DCT-8.

In the disclosure, the vertical transform or the horizontal transform is differently applied to each row and/or each column.

In the disclosure, an AMT flag or the AMT index is defined in at least one level of a sequence, a picture, a slice, a block, a coding unit, a transform unit or a prediction unit.

The disclosure provides an apparatus for decoding a video signal based on adaptive multiple transforms (AMT), including a parsing unit configured to parse an AMT index from the video signal, wherein the AMT index indicates any one of a plurality of transform combinations within a transform configuration group, and the transform configuration group includes discrete sine transform type 7 (DST7) and discrete cosine transform type 8 (DCT8), a inverse transform unit configured to derive a transform combination corresponding to the AMT index and perform an inverse transform on a current block based on the transform combination, and a reconstruction unit configured to reconstruct the video signal using the inverse-transformed current block. The AMT indicates a transform method performed based on a transform combination adaptively selected from the plurality of transform combinations. The transform combination is configured with a horizontal transform and a vertical transform and includes at least one of the DST-7 or the DCT-8.

In the disclosure, the parsing unit is configured to further parse, from the video signal, an AMT flag indicating whether an AMT is performed, and the AMT index is obtained when an AMT is performed based on the AMT flag.

In the disclosure, the inverse transform unit is configured to further check whether a number of non-zero transform coefficient is greater than a threshold if an AMT is performed based on the AMT flag, and the AMT index is obtained when the number of non-zero transform coefficient is greater than the threshold.

In the disclosure, the inverse transform unit is configured to apply an inverse transform of the DST-7 or an inverse transform of the DCT-8 to each row after applying the inverse transform of the DST-7 or the inverse transform of the DCT-8 to each column if the vertical transform or the horizontal transform is the DST-7 or DCT-8.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, the encoder 100 may include an image segmentation unit 110, a transform unit 120, a quantization unit 130, a dequantization unit 140, an inverse transform unit 150, a filtering unit 160, a decoded picture buffer (DPB) 170, an inter-prediction unit 180, an intra-predictor 185 and an entropy encoding unit 190.

The image segmentation unit 110 may segment an input image (or a picture or frame), input to the encoder 100, into one or more processing units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter prediction unit 180 or intra prediction unit 185 from the input image signal. The generated residual signal may be transmitted to the transform unit 120.

The transform unit 120 may generate a transform coefficient by applying a transform scheme to a residual signal. The transform process may be applied a block (square or rectangle) split by a square block of a quadtree structure or a binarytree structure, a ternary structure or an asymmetric structure.

The transform unit 120 may perform a transform based on a plurality of transforms (or transform combinations). Such a transform method may be called an enhanced multiple transform (EMT). The EMT may be referred to as an adaptive multiple transform (AMT) or a multiple transform selection (MTS).

The EMT (or AMT or MTS) may mean a transform method performed based on transform (or transform combinations) adaptively selected from a plurality of transforms (or transform combinations).

The plurality of transforms (or transform combinations) may include transform (or transform combinations) described in FIGS. 6 and 12 to 17 of the disclosure. In the disclosure, the transform or the transform type may be indicated like DCT-Type 2, DCT-II, DCT-2 or DCT2, for example.

The transform unit 120 may perform the following embodiments.

The disclosure provides a method of substituting discrete cosine transform type 8 (DCT8) with a modified form of discrete sine transform type 7 (DST7) while using kernel coefficient data of the DST7 without any change.

Furthermore, the disclosure provides a method of substituting DST7 with DST4 and substituting DCT8 with a modified form of DCT4 while using kernel coefficient data of the DST4 without any change.

Furthermore, the disclosure provides a method of configuring transform configuration groups based on at least one of a prediction mode, a block size or a block shape and differently configuring a transform corresponding to each row or column, wherein one transform configuration group is configured with one or more transform combinations and one transform combination is configured with transforms corresponding to all rows and columns.

Furthermore, the disclosure provides a method of configuring transforms for all rows and columns based on one transform, such as DST7 or DST4, and a transform modified therefrom.

Furthermore, the disclosure provides a method of configuring a transform set which may be derived with respect to all transforms in such a way as to use linear relations between all trigonometric transforms (8 DCTs, 8 DSTs) or adding a post/pre-processing process to a transform input/output part, computing a union of the derived transform sets, and using the union to determine a transform combination.

Detailed embodiments thereof are described more specifically in the disclosure.

The quantization unit 130 may quantize a transform coefficient and transmit it to the entropy encoding unit 190. The entropy encoding unit 190 may entropy-code a quantized signal and output it as a bitstream.

The transform unit 120 and the quantization unit 130 are described as separate function units, but the disclosure is not limited thereto. The transform unit 120 and the quantization unit 130 may be combined into a single function unit. Likewise, the dequantization unit 140 and the transform unit 150 may be combined into a single function unit.

The quantized signal output by the quantization unit 130 may be used to generate a prediction signal. For example, a residual signal may be reconstructed by applying dequantization and an inverse transform to the quantized signal through the dequantization unit 140 and the transform unit 150 within a loop. A reconstructed signal may be generated by adding the reconstructed residual signal to a prediction signal output by the inter prediction unit 180 or the intra prediction unit 185.

Meanwhile, an artifact in which a block boundary appears may occur due to a quantization error occurring in such a compression process. Such a phenomenon is called a blocking artifact, which is one of important factors in evaluating picture quality. In order to reduce such an artifact, a filtering process may be performed. Picture quality can be improved by reducing an error of a current picture while removing a blocking artifact through such a filtering process.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform a temporal prediction and/or a spatial prediction on the reconstructed picture in order to remove temporal redundancy and/or spatial redundancy. In this case, the reference picture used for the prediction may be a transformed signal obtained via the quantization and dequantization on a block basis in the previous encoding/decoding. Thus, this may result in blocking artifacts or ringing artifacts.

Accordingly, in order to solve the performance artifact attributable to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in a reconstructed picture. An interpolation method may include linear interpolation, bi-linear interpolation, a Wiener filter, etc.

The interpolation filter is applied to a reconstructed picture, and thus can improve the precision of a prediction. For example, the inter prediction unit 180 may generate an interpolated pixel by applying the interpolation filter to an integer pixel, and may perform a prediction using an interpolated block configured with interpolated pixels as a prediction block.

Meanwhile, the intra prediction unit 185 may predict a current block with reference to samples peripheral to a block to be now encoded. The intra prediction unit 185 may perform the following process in order to perform intra prediction. First, the prediction unit may prepare a reference sample necessary to generate a prediction signal. Furthermore, the prediction unit may generate a prediction signal using the prepared reference sample. Thereafter, the prediction unit encodes a prediction mode. In this case, the reference sample may be prepared through reference sample padding and/or reference sample filtering. The reference sample may include a quantization error because a prediction and reconstruction process has been performed on the reference sample. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

Figure 2:
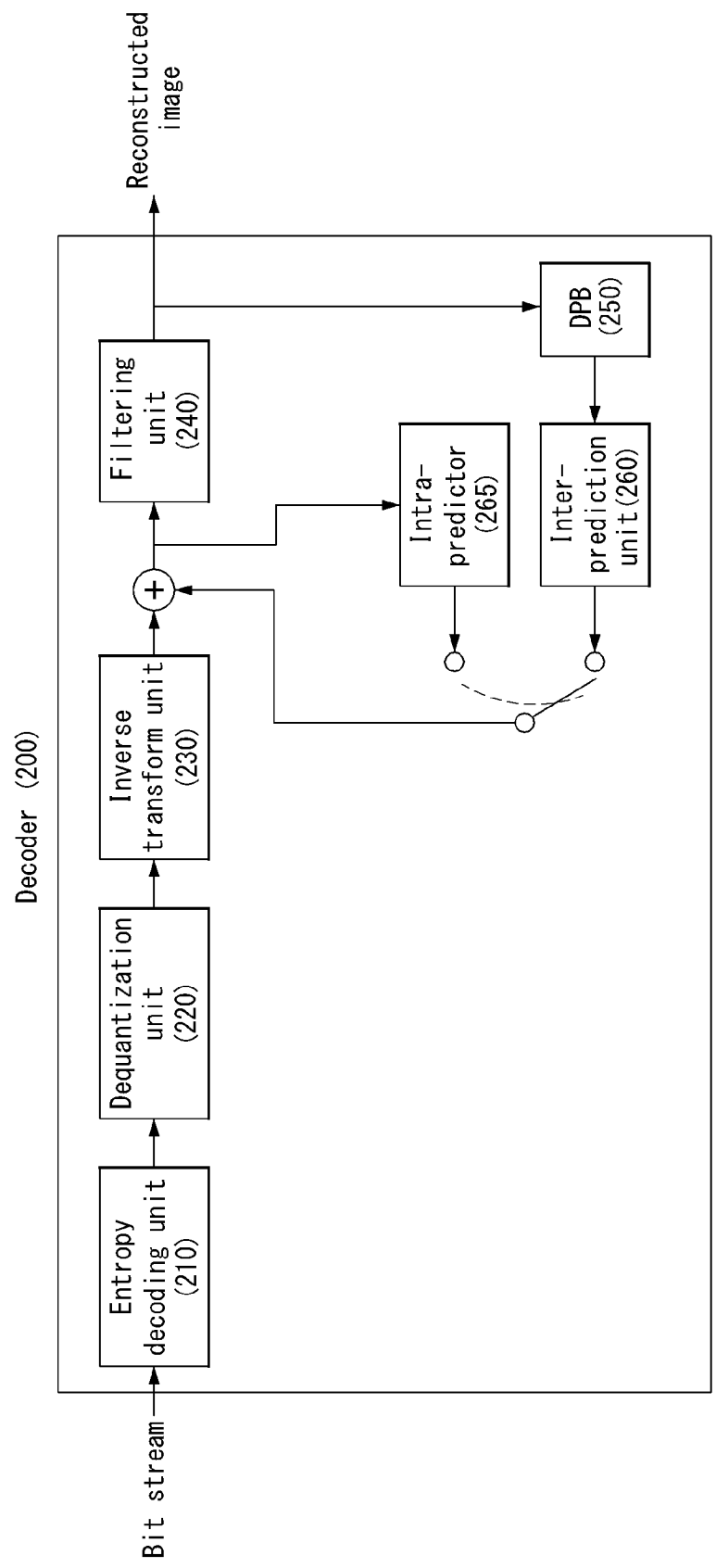
FIG. 2 is a block diagram illustrating the configuration of a decoder for decoding a video signal according to an embodiment of the present invention.

FIG. 2 is a block diagram illustrating the configuration of a decoder for decoding a video signal according to an embodiment of the present invention.

Referring to FIG. 2, the decoder 200 may be configured to include a parsing unit (not illustrated), an entropy decoding unit 210, a dequantization unit 220, a transform unit 230, a filter 240, a decoded picture buffer (DPB) 250, an inter prediction unit 260 and an intra prediction unit 265.

Furthermore, a reconstructed image signal output through the decoder 200 may be played back through a playback device.

The decoder 200 may receive a signal output by the encoder 100 of FIG. 1. The received signal may be entropy-decoded through the entropy decoding unit 210.

The dequantization unit 220 obtains a transform coefficient from the entropy-decoded signal using quantization step size information.

The transform unit 230 obtains a residual signal by inverse-transforming the transform coefficient.

In this case, the disclosure provides a method of configuring a transform combination for each transform configuration group distinguished based on at least one of a prediction mode, a block size or a block shape. The transform unit 230 may perform an inverse transform based on a transform combination configured by the disclosure. Furthermore, embodiments described in the disclosure may be applied.

The dequantization unit 220 and the transform unit 230 are described as separate function units, but the disclosure is not limited thereto. The dequantization unit 220 and the transform unit 230 may be combined into a single function unit.

A reconstructed signal is generated by adding the obtained residual signal to a prediction signal output by the inter prediction unit 260 or the intra prediction unit 265.

The filter 240 may output or transmit the reconstructed signal to a playback device or the decoded picture buffer unit 250 by applying filtering to the reconstructed signal. The filtered signal transmitted to the decoded picture buffer unit 250 may be used as a reference picture in the inter prediction unit 260.

In the disclosure, the embodiments described in the transform unit 120 and each function unit of the encoder 100 may be identically applied to the transform unit 230 and corresponding function unit of the decoder.

Figure 3A:
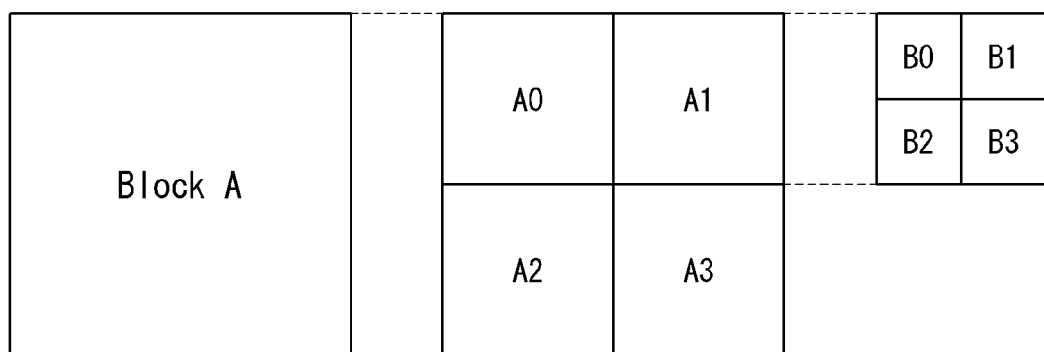
FIGS. 3A to 3D illustrate embodiments to which the disclosure may be applied.
Figure 3B:
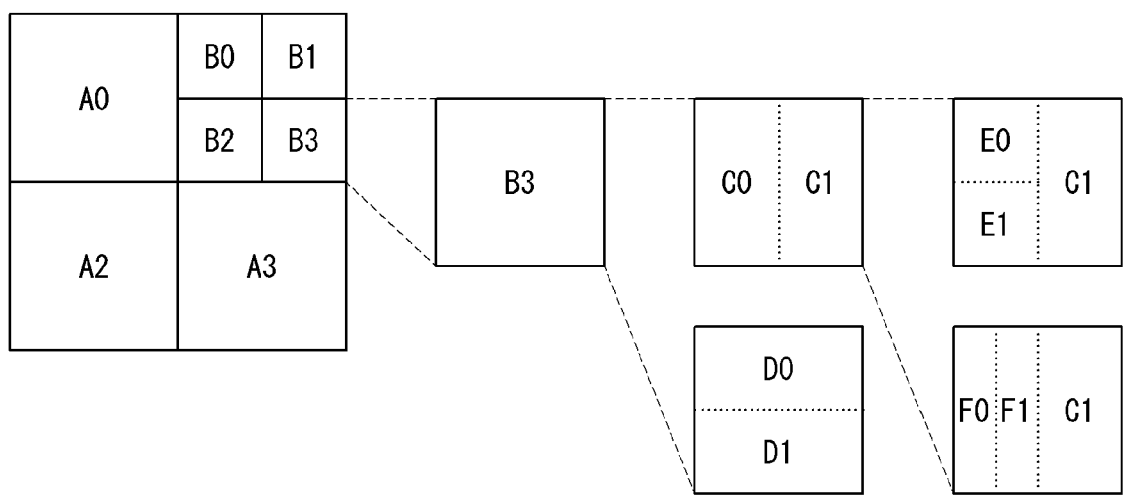
Figure 3C:
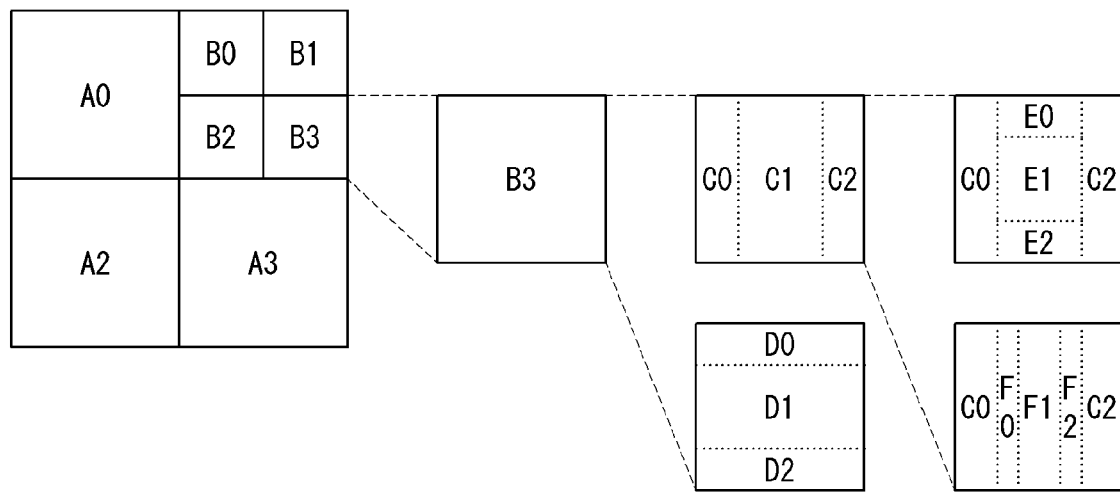
Figure 3D:
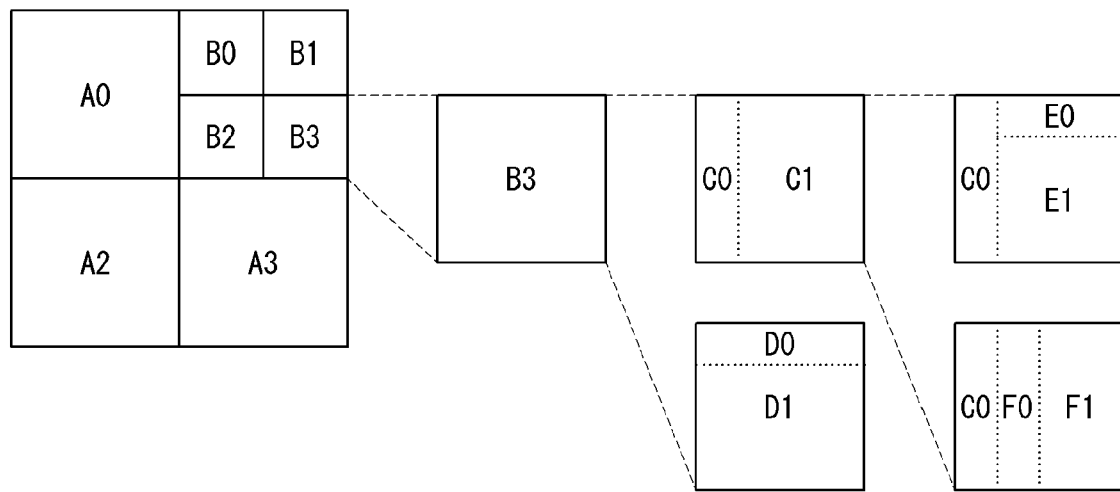

FIGS. 3A to 3D illustrate embodiments to which the disclosure may be applied. FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×½N, 2N×N, 2N×½N) and a vertical TT (½N×2N, N×2N, ½N×2N). The AT may have four types of splits of a horizontal-up AT (2N×½N, 2N×3/2N), a horizontal-down AT (2N×3/2N, 2N×½N), a vertical-left AT (½N×2N, 3/2N×2N), and a vertical-right AT (3/2N×2N, ½N×2N). Each BT, TT, or AT may be further split recursively using the BT, TT, or AT.

FIG. 3A shows an example of a QT split. A block A may be split into four subblocks A0, A1, A2, and A3 by a QT. The subblock A1 may be split into four subblocks B0, B1, B2, and B3 by a QT.

FIG. 3B shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3C shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3D shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

Figure 5:
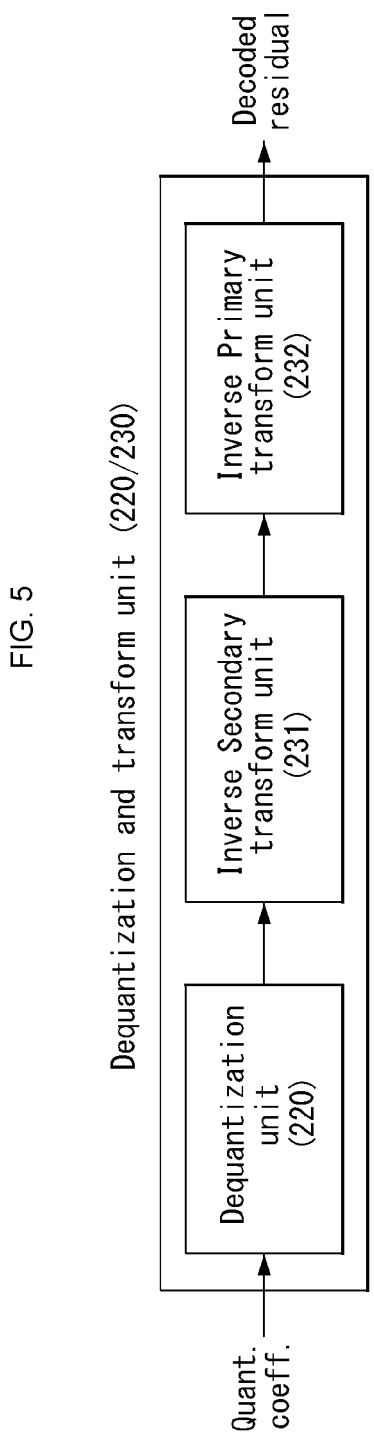
FIG. 5 is an embodiment to which the disclosure is applied and illustrates a schematic block diagram of a dequantization and transform unit 220/230 within a decoder.

FIGS. 4 and 5 are embodiments to which the disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the disclosure, when a transform is performed, the transform may be performed through a plurality of steps. For example, as in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

A discrete cosine transform type 2 (hereinafter "DCT2") may be applied to the primary transform. Alternatively, a discrete sine transform-type 7 (hereinafter called "DST7") may be applied to a specific case. For example, in the intra prediction mode, the DST7 may be applied to a 4×4 block.

Furthermore, combinations of several transforms (DST 7, DCT 8, DST 1, and DCT 5) of the adaptive multiple transforms (AMT) may be applied to the primary transform. For example, FIG. 6 may be applied.

The secondary transform unit 122 may apply a secondary transform to the primary transformed signal. In this case, the secondary transform may be pre-defined in a table form in the encoder and/or the decoder.

In one embodiment, a non-separable secondary transform (hereinafter "NSST") may be conditionally applied to the secondary transform. For example, the NSST is applied to only an intra prediction block, and may have a transform set which may be applied to each prediction mode group.

In this case, the prediction mode group may be configured based on symmetry for a prediction direction. For example, a prediction mode 52 and a prediction mode 16 are symmetrical with respect to a prediction mode 34 (diagonal direction), and may form a single group. Accordingly, the same transform set may be applied to the single group. In this case, when a transform for the prediction mode 52 is applied, it is applied after input data is transposed. The reason for this is that the transform set for the prediction mode 16 is the same as that for the prediction mode 52.

Meanwhile, the planar mode and the DC mode have respective transform set because symmetry for direction is not present, the respective transform set may be configured with two transforms. The remaining directional mode may be configured with three transforms for each transform set.

In another embodiment, the NSST is not applied to whole area of primary transformed block, but may be applied to only a top left 8×8 area. For example, if the size of a block is 8×8 or more, an 8×8 NSST is applied. If the size of a block is less than 8×8, a 4×4 NSST is applied, in this case, after the block is split into 4×4 blocks, a 4×4 NSST is applied to each of the blocks.

The quantization unit 130 may perform quantization on the secondary transformed signal.

The dequantization and transform unit 140/150 inversely performs the aforementioned process, and a redundant description thereof is omitted.

FIG. 5 illustrates a schematic block diagram of a dequantization and transform unit 220/230 within the decoder.

Referring to FIG. 5, the dequantization and transform unit 220/230 may include the dequantization unit 220, an inverse secondary transform unit 231 and an inverse primary transform unit 232.

The dequantization unit 220 obtains a transform coefficient from an entropy-decoded signal using quantization step size information.

The inverse secondary transform unit 231 performs an inverse secondary transform on the transform coefficient. In this case, the inverse secondary transform indicates an inverse transform of the secondary transform described in FIG. 4.

The inverse primary transform unit 232 performs an inverse primary transform on the inverse secondary transformed signal (or block), and obtains a residual signal. In this case, the inverse primary transform indicates an inverse transform of the primary transform described in FIG. 4.

The disclosure provides a method of configuring a transform combination for each transform configuration group distinguished by at least one of a prediction mode, a block size or a block shape. The inverse primary transform unit 232 may perform an inverse transform based on a transform combination configured by the disclosure. Furthermore, embodiments described in the disclosure may be applied.

FIG. 6 is an embodiment to which the disclosure is applied and is a table illustrating a transform configuration group to which adaptive multiple transforms (AMT) is applied.

Transform Configuration Group to which Adaptive Multiple Transforms (AMT) is Applied.

In the disclosure, an j-th transform combination candidate for a transform configuration group Gi is indicated in pairs, such as Equation 1.

$$(H(G_i, j), V(G_i, j)) \quad \text{[Equation 1]}$$

In this case, $H(G_i, j)$ indicates a horizontal transform for an j-th candidate, and $V(G_i, j)$ indicates a vertical transform for the j-th candidate. For example, in FIG. 6, $H(G_3, 2)$=DST7, $V(G_3, 2)$=DCT8 may be indicated. According to context, a value assigned to $H(G_i, j)$ or $V(G_i, j)$ may be a nominal value for distinguishment between transforms as in the example or may be an index value indicating a corresponding transform or may be a 2-dimensional matrix (2D matrix) for a corresponding transform.

Furthermore, in the disclosure, 2D matrix values for a DCT and a DST may be indicated like Equations 2 to 3.

$$DCT \text{ type } 2: C_N^{II}, DCT \text{ type } 8: C_N^{VIII} \quad \text{[Equation 2]}$$

$$DST \text{ type } 7: S_N^{VII}, DST \text{ type } 4: S_N^{IV} \quad \text{[Equation 3]}$$

In this case, whether a transform is a DST or a DCT is indicated as S or C, a type number is indicated as a superscript in the form of a Roman number, and N of a subscript indicates an N×N transform. Furthermore, it is assumed that in the 2D matrices, such as $C_N^{II}$ and $S_N^{IV}$, column vectors form a transform basis.

Referring to FIG. 6, transform configuration groups may be determined based on a prediction mode, and the number of groups may be a total of 6 G0~G5. Furthermore, G0~G4 corresponds to a case where an intra prediction is applied, and G5 indicates transform combinations (or transform set, the transform combination set) applied to a residual block generated by an inter prediction.

One transform combination may be configured with a horizontal transform (or row transform) applied to the rows of a corresponding 2D block and a vertical transform (or column transform) applied to the columns of the corresponding 2D block.

In this case, each of the transform configuration groups may have four transform combination candidates. The four transform combination candidates may be selected or determined through transform combination indices 0~3. The encoder may encode a transform combination index and transmit it to the decoder.

In one embodiment, residual data (or a residual signal) obtained through an intra prediction may have different statistical characteristics depending on its intra prediction mode. Accordingly, as in FIG. 6, other transforms not a common cosine transform may be applied for each intra prediction mode.

FIG. 6 illustrates a case where 35 intra prediction modes are used and a case where 67 intra prediction modes are used. A plurality of transform combinations may be applied to each transform configuration group distinguished in an intra prediction mode column. For example, the plurality of transform combinations may be configured with four (row direction transform and column direction transform) combinations. As a detailed example, in a group 0, a total of four combinations are available because DST-7 and DCT-5 can be applied to both a row (horizontal) direction and a column (vertical) direction.

Since a total of four transform kernel combinations may be applied to each intra prediction mode, a transform combination index for selecting one of the four transform kernel combinations may be transmitted for each transform unit. In the disclosure, the transform combination index may be called an AMT index and may be represented as amt_idx.

Furthermore, in addition to the transform kernels proposed in FIG. 6, a case where DCT-2 is the best for both a row direction and a column direction may occur from the nature of a residual signal. Accordingly, a transform may be adaptively performed by defining an AMT flag for each coding unit. In this case, when the AMT flag is 0, DCT-2 may be applied to both the row direction and the column direction. When the AMT flag is 1, one of the four combinations may be selected or determined through an AMT index.

In one embodiment, when the AMT flag is 1, if the number of non-zero transform coefficient for one transform unit is not greater than a threshold, DST-7 may be applied to both the row direction and the column direction without applying the transform kernels of FIG. 6. For example, the threshold may be set to 2, which may be differently set based on the size of a block size or transform unit. This may also be applied to other embodiments of the disclosure.

In one embodiment, transform coefficient values can be first parsed. If the number of non-zero transform coefficient is not greater than the threshold, an AMT index is not parsed and DST-7 is applied, thereby being capable of reducing the amount of additional information transmitted.

In one embodiment, when the AMT flag is 1, if the number of non-zero transform coefficient for one transform unit is greater than the threshold, an AMT index is parsed, and a horizontal transform and a vertical transform may be determined based on the AMT index.

In one embodiment, an AMT may be applied to a case where both the width and height of a transform unit is 32 or less.

In one embodiment, FIG. 6 may be present through off-line training.

In one embodiment, the AMT index may be defined as one index capable of indicating a combination of a horizontal transform and a vertical transform. Alternatively, the AMT index may separately define a horizontal transform index and a vertical transform index.

In one embodiment, the AMT flag or the AMT index may be defined in at least one level of a sequence, a picture, a slice, a block, a coding unit, a transform unit or a prediction unit. For example, the AMT flag or the AMT index may be defined in at least one of a sequence parameter set (SPS) or a transform unit.

Embodiment (1): Method of Substituting DCT8 with Modified Form of DST7

$C_N^{VIII}$ and $S_N^{VII}$ satisfy a relation equation of Equation 4.

$$C_N^{VIII} = J_N S_N^{VII} D_N \quad \text{[Equation 4]}$$

$$\text{where } [J_N]_{ij,i,j=0,\ldots,N-1} = \begin{cases} 1, & j = N-1-i \\ 0, & \text{otherwise} \end{cases}$$

$$\text{and } [D_N]_{ij,i,j=0,\ldots,N-1} = \text{diag}((-1)^k),$$

$$k = 0, \ldots, N-1 = \begin{cases} (-1)^i, & i = j \\ 0, & i \neq j \end{cases}$$

In Equation 4, $J_N$ is a matrix having a value of 1 only in a reverse diagonal line, and $D_N$ is a matrix in which 1 and −1 alternately appear only in a diagonal line.

Equation 5 illustrates a process of obtaining an Nx1 transform coefficient vector y by applying a forward transform $((C_N^{VIII})^T)$ of DCT8 to an Nx1 input vector $x=[x_0\ x_1\ \ldots\ x_{N-1}]^T$.

$$y = (C_N^{VIII})^T x = D_N (S_N^{VII})^T J_N x = (S_N^{VII,A})^T x_R = (S_N^{VII,AR})^T x$$

where $x_R = [x_{N-1} x_{N-2} \ldots x_0]^T$ $S_N^{VII,A} = [s_0 -s_1 s_2 -s_3 \ldots (-1)^{N-2} s_{N-2} (-1)^{N-1} s_{N-1}]$ and $S_N^{VII,AR} = [s_{R,0} -s_{R,1} s_{R,2} -s_{R,3} \ldots (-1)^{N-2} s_{R,N-2} (-1)^{N-1} s_{R,N-1}]$ if $S_N^{VII} = [s_0 s_1 \ldots s_{N-1}]$ and $s_{R,i} = J_N s_i$    [Equation 5]

In this case, a subscript A is an abbreviation of alternate and indicates that a sign is alternately changed. A subscript R means that order of vectors is changed, and a subscript AR means that the two cases are applied.

If the equation is deployed as in Equation 5 by applying Equation 4, a separate memory space for storing $C_N^{VIII}$ is not necessary within a codec because a transform for $C_N^{VIII}$ can be applied using only transform base vectors forming $S_N^{VII}$.

As in Equation 5, when a forward transform for $C_N^{VIII}$ is applied, $x_R$ may be calculated and $(S_N^{VII,A})^T$ may be multiplied or $(S_N^{VII,AR})^T$ may be multiplied without changing x. Furthermore, when $(S_N^{VII,A})^T$ and $(S_N^{VII,AR})^T$ are applied, sign inversion is not applied to the base vectors themselves forming $S_N^{VII}$, but as in Equation 6, an inner product may be calculated by applying sign inversion to $x_R$ when each base vector and an inner product for x are calculated.

$$y = D_N(S_N^{VII})^T J_N x = \begin{bmatrix} s_0^T & 0 & \cdots & 0 \\ 0 & s_1^T & \cdots & 0 \\ \vdots & \vdots & \ddots & \vdots \\ 0 & 0 & \cdots & s_{N-1}^T \end{bmatrix} \begin{bmatrix} (-1)^{N-1} x_R \\ (-1)^{N-2} x_R \\ \vdots \\ x_R \end{bmatrix} \quad \text{[Equation 6]}$$

Equations 5 and 6 propose a method of obviating a memory necessary to store $C_N^{VIII}$ by representing $C_N^{VIII}$ as kernel coefficient data of $S_N^{VII}$. In addition, $C_N^{VIII,F}$ may be used instead of $C_N^{VIII}$ as in Equation 7 without applying the relation equation of Equation 4 without any change.

$$C_N^{VIII,F} = S_N^{VII,R} = J_N S_N^{VII} = [s_{R,0} s_{R,1} \cdots s_{R,N-1}]$$

$$y = (C_N^{VIII,F})^T x = (S_N^{VII})^T J_N x = (S_N^{VII})^T x_R = (S_N^{VII,R})^T x \quad \text{[Equation 7]}$$

In this case, $C_N^{VIII,F}$ indicates flipped DST7. If $C_N^{VIII,F}$ is used as in Equation 7, this is the same as that $S_N^{VII}$ is applied to $x_R$ instead of x. Accordingly, it is not necessary to alternately apply sign inversion as in Equations 5 and 6. A backward (inverse) transform application method corresponding to Equation 5 is the same as Equation 8, and a backward (inverse) transform application method corresponding to Equation 7 is the same as Equation 9.

$$x = C_N^{VIII} y = J_N S_N^{VII} D_N y = (S_N^{VII,R}) y_A = (S_N^{VII,AR}) y$$

where $y_A = \lfloor y_0 - y_1, y_2 - y_3 \cdots (-1)^{N-2} y_{N-2} (-1)^{N-1} y_{N-1} \rfloor$ [Equation 8]

$$x = C_N^{VIII,F} = J_N S_N^{VII} y = (S_N^{VII,R}) y = (J_N z = z_R)$$

where $z = S_N^{VII} y, z_R = [z_{N-1} z_{N-2} \cdots z_0]$ [Equation 9]

Embodiment (2): Method of Substituting DST7 with DST4 and Substituting DCT8 with Modified Form of DST4

In one embodiment of the disclosure, there is proposed a method of using DST4 instead of DST7. As in Equation 10, the same relation equation is established between DST4 and DCT4 as in between DST7 and DCT8.

$$C_N^{IV} = J_N S_N^{IV} D_N \quad \text{[Equation 10]}$$

Accordingly, if DST4 is used instead of DST7, if DCT4 is used instead of DCT8, DCT4 may be represented as DST4 using Equation 10. Accordingly, a separate memory space for storing DCT4 is not necessary. A method of applying a forward transform to DCT4 using the same method as Equation 5 is described like Equation 11.

$$y = (C_N^{IV})^T x = D_N(S_N^{IV})^T J_N x = (S_N^{IV,A})^T x_R = (S_N^{IV,A})^T x$$

where $x_R = [x_{N-1} x_{N-2} \cdots x_0]^T$ $$S_N^{IV,A} = \lfloor s_0 - s_1, s_2 - s_3 \cdots (-1)^{N-2} s_{N-2} (-1)^{N-1} s_{N-1} \rfloor$$

and $S_N^{IV,AR} = \lfloor s_{R,0} - s_{R,1} s_{R,2} - s_{R,3} \cdots (-1)^{N-2} s_{R,N-2} (-1)^{N-1} s_{R,N-1} \rfloor$ if $S_N^{IV} = [s_0 s_1 \cdots s_{N-1}]$ and $s_{R,1} = J_N s_1$ [Equation 11]

In Equation 12, as in Equation 6, the same results as Equation 11 can be obtained without any modification for kernel coefficient data of $S_N^{IV}$ by properly taking sign inversion for $x_R$.

$$y = D_N(S_N^{IV})^T J_N x = \begin{bmatrix} s_0^T & 0 & \cdots & 0 \\ 0 & s_1^T & \cdots & 0 \\ \vdots & \vdots & \ddots & \vdots \\ 0 & 0 & \cdots & s_{N-1}^T \end{bmatrix} \begin{bmatrix} (-1)^{N-1} x_R \\ (-1)^{N-2} x_R \\ \vdots \\ x_R \end{bmatrix} \quad \text{[Equation 12]}$$

Furthermore, as in Equation 13, sign inversion may be obviated using $C_N^{IV,F}$ instead of $C_N^{IV}$ using the same method as Equation 7.

$$C_N^{IV,F} = S_N^{IV,R} = J_N S_N^{IV} = [s_{R,0} s_{R,1} \cdots s_{R,N-1}]$$

$$y = (C_N^{IV,F})^T x = (S_N^{IV})^T J_N x = (S_N^{IV})^T x_R = (S_N^{IV,R})^T x \quad \text{[Equation 13]}$$

A backward (inverse) transform application method corresponding to Equation 11 is the same as Equation 14, and a backward (inverse) transform application method corresponding to Equation 13 is the same as Equation 15.

$$x = C_N^{IV} y = J_N S_N^{IV} D_N y = (S_N^{IV,R}) y_A = (S_N^{IV,AR}) y$$

where $y_A = \lfloor y_0 - y_1, y_2 - y_3 \cdots (-1)^{N-2} y_{N-2} (-1)^{N-1} y_{N-1} \rfloor$ [Equation 14]

$$x = C_N^{IV,F} y = J_N S_N^{IV} y = (S_N^{IV,R}) y = J_N z = z_R$$

where $z = S_N^{IV} y, z_R = [z_{N-1} z_{N-2} \cdots z_0]$ [Equation 15]

Figure 7:
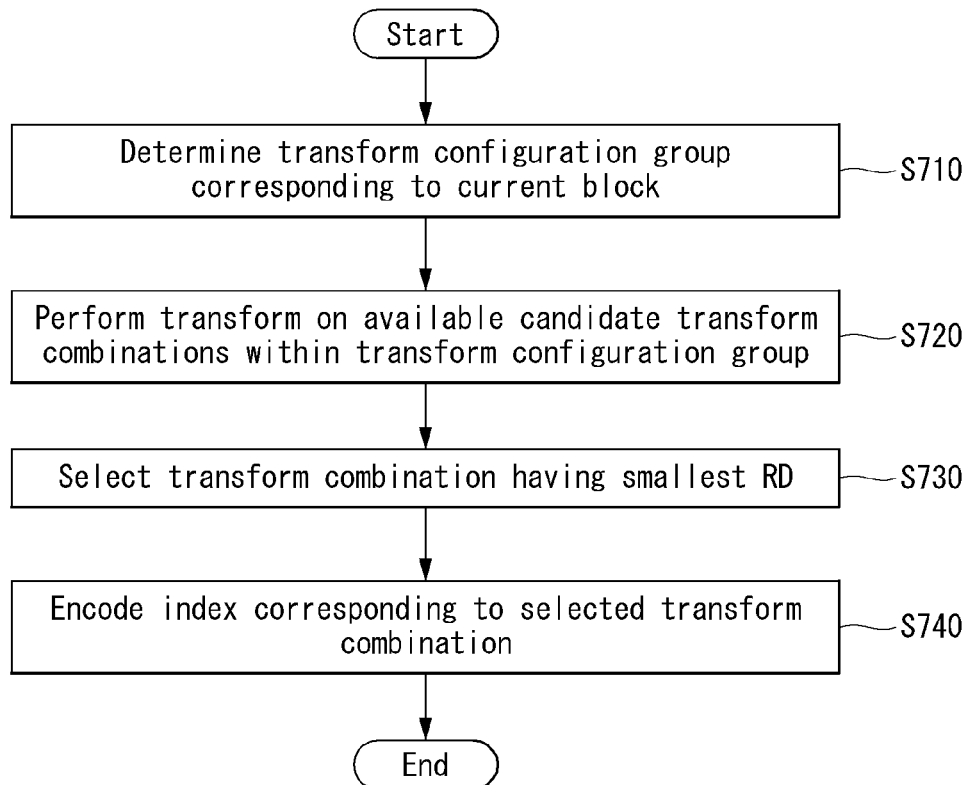
FIG. 7 is an embodiment to which the disclosure is applied and is a flowchart illustrating an encoding process on which adaptive multiple transforms (AMT) is performed.

FIG. 7 is an embodiment to which the disclosure is applied and is a flowchart illustrating an encoding process on which adaptive multiple transforms (AMT) is performed.

In the disclosure, basically, an embodiment in which transforms are separately applied to a horizontal direction and a vertical direction is described, but a transform combination may be configured with non-separable transforms.

Alternatively, separable transforms and non-separable transforms may be mixed and configured. In this case, if a non-separable transform is used, selecting transform for each row/column or for each horizontal/vertical direction is not necessary, and the transform combinations of FIG. 6 may be used only when separable transforms are selected.

Furthermore, the methods proposed in the disclosure may be applied regardless of a primary transform or a secondary transform. That is, there is not limit that the methods must be applied to only any one of a primary transform or a secondary transform and may be applied to both. In this case, the primary transform may mean a transform for first transforming a residual block, and the secondary transform may mean a transform for applying a transform to a block generated as the results of the primary transform.

First, the encoder may determine a transform configuration group corresponding to a current block (S710). In this case, the transform configuration group may mean the transform configuration group of FIG. 6, but the disclosure is not limited thereto. The transform configuration group may be configured with other transform combinations.

The encoder may perform a transform on available candidate transform combinations within the transform configuration group (S720).

The encoder may determine or select a transform combination having the smallest rate distortion (RD) cost based on a result of the execution of the transform (S730).

The encoder may encode a transform combination index corresponding to the selected transform combination (S740).

Figure 8:
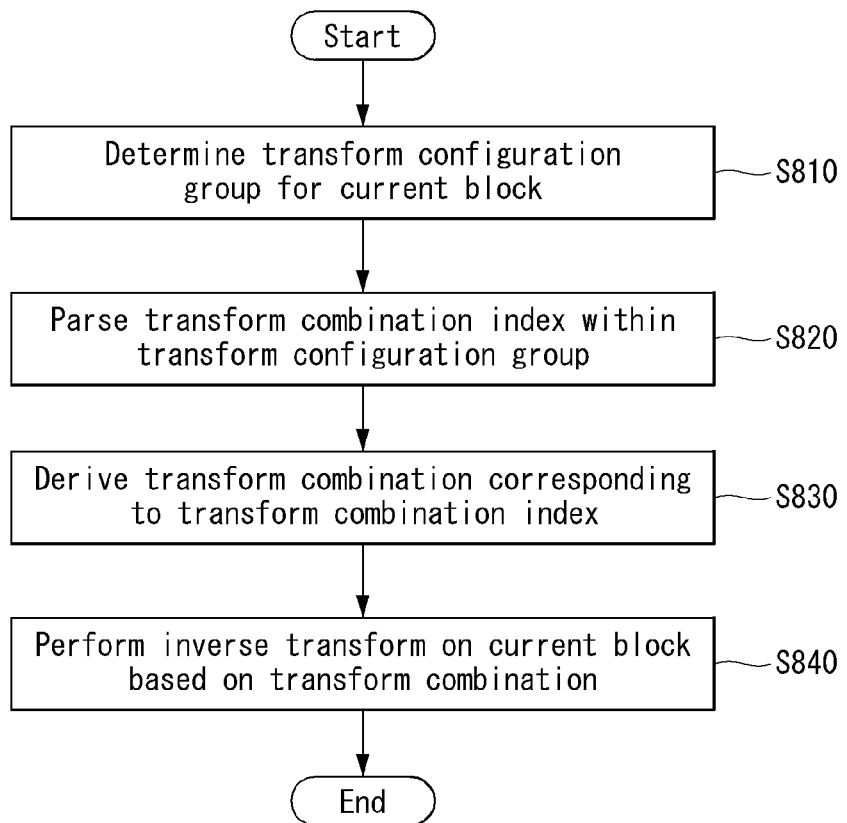
FIG. 8 is an embodiment to which the disclosure is applied and is a flowchart illustrating a decoding process on which adaptive multiple transforms (AMT) is performed.

FIG. 8 is an embodiment to which the disclosure is applied and is a flowchart illustrating a decoding process on which adaptive multiple transforms (AMT) is performed.

First, the decoder may determine a transform configuration group for a current block (S810).

The decoder may parse (or obtain) a transform combination index from a video signal. In this case, the transform combination index may correspond to any one of a plurality of transform combinations within the transform configuration group (S820). For example, the transform configuration group may include discrete sine transform type 7 (DST7) and discrete cosine transform type 8 (DCT8). The transform combination index may be called an AMT index.

In one embodiment, the transform configuration group may be configured based on at least one of a prediction mode, block size or block shape of a current block.

The decoder may derive a transform combination corresponding to the transform combination index (S830). In this case, the transform combination is configured with a horizontal transform and a vertical transform, and may include at least one of the DST-7 or the DCT-8.

Furthermore, the transform combination may mean the transform combination described in FIG. 6, but the disclosure is not limited thereto. That is, a configured based on another transform combination according to another embodiment of the disclosure is possible.

The decoder may perform an inverse transform on the current block based on the transform combination (S840). If the transform combination is configured with a row (horizontal) transform and a column (vertical) transform, after the row (horizontal) transform is first applied, the column (vertical) transform may be applied. In this case, the disclosure is not limited thereto and may be reversely applied or if the transform combination is configured with non-separable transforms, the non-separable transforms may be immediately applied.

In one embodiment, if the vertical transform or the horizontal transform is the DST-7 or DCT-8, an inverse transform of the DST-7 or an inverse transform of the DCT-8 may be applied for each column and then applied for each row.

In one embodiment, the vertical transform or the horizontal transform may be differently applied to each row and/or each column.

In one embodiment, the transform combination index may be obtained based on an AMT flag indicating whether an AMT is performed. That is, the transform combination index may be obtained if an AMT is performed based on the AMT flag.

In one embodiment, the decoder may check whether the number of non-zero transform coefficient is greater than a threshold. In this case, the transform combination index may be obtained when the number of non-zero transform coefficient is greater than the threshold.

In one embodiment, the AMT flag or the AMT index may be defined in at least one level of a sequence, a picture, a slice, a block, a coding unit, a transform unit or a prediction unit.

In one embodiment, the inverse transform may be applied when both the width and height of a transform unit is 32 or less.

Meanwhile, in another embodiment, the process of determining a transform configuration group and the process of parsing a transform combination index may be performed at the same time. Alternatively, step S810 may be preset in the encoder and/or the decoder and omitted.

Figure 9:
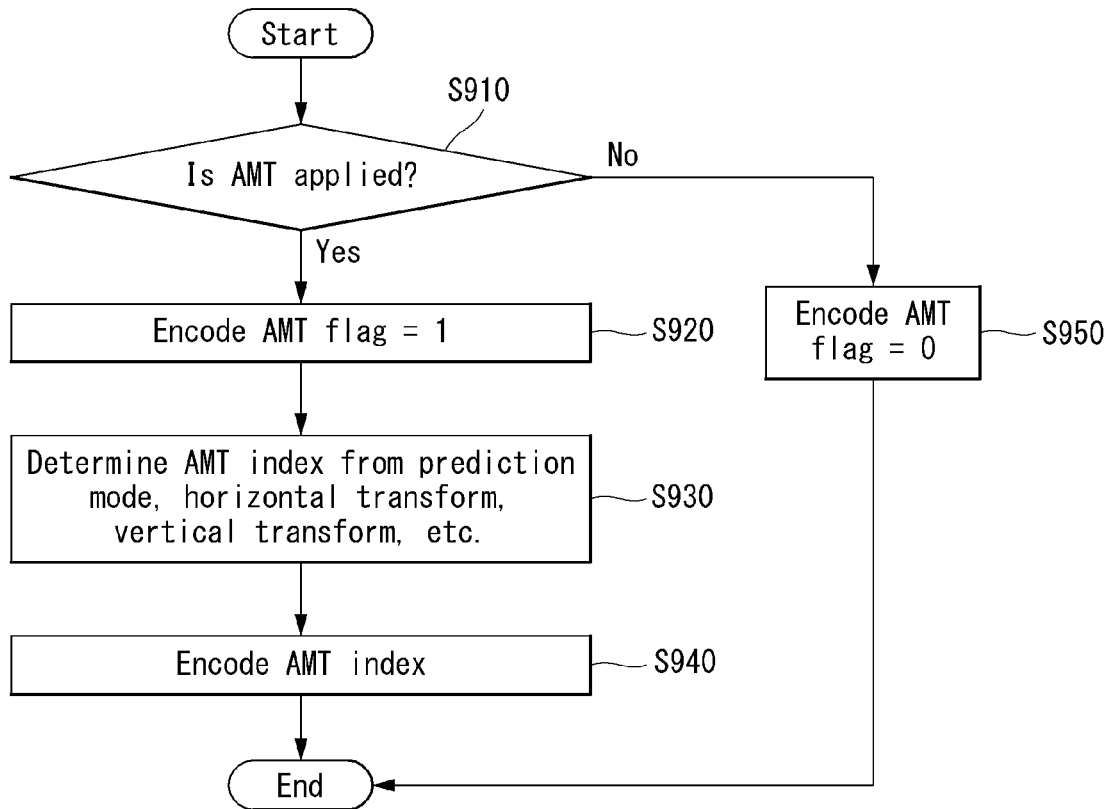
FIG. 9 is an embodiment to which the disclosure is applied and is a flowchart for describing a process of encoding an AMT flag and an AMT index.

FIG. 9 is an embodiment to which the disclosure is applied and is a flowchart for describing a process of encoding an AMT flag and an AMT index.

The encoder may determine whether adaptive multiple transforms (AMT) is applied to a current block (S910).

If the adaptive multiple transforms (AMT) is applied, the encoder may encode an AMT flag=1 (S920).

Furthermore, the encoder may determine an AMT index based on at least one of a prediction mode, horizontal transform, and vertical transform of the current block (S930). In this case, the AMT index means an index indicating any one of a plurality of transform combinations for each intra prediction mode, and the AMT index may be transmitted for each transform unit.

When the AMT index is determined, the encoder may encode the AMT index (S940).

Meanwhile, if the adaptive multiple transforms (AMT) is not applied, the encoder may encode the AMT flag=0 (S950).

Figure 10:
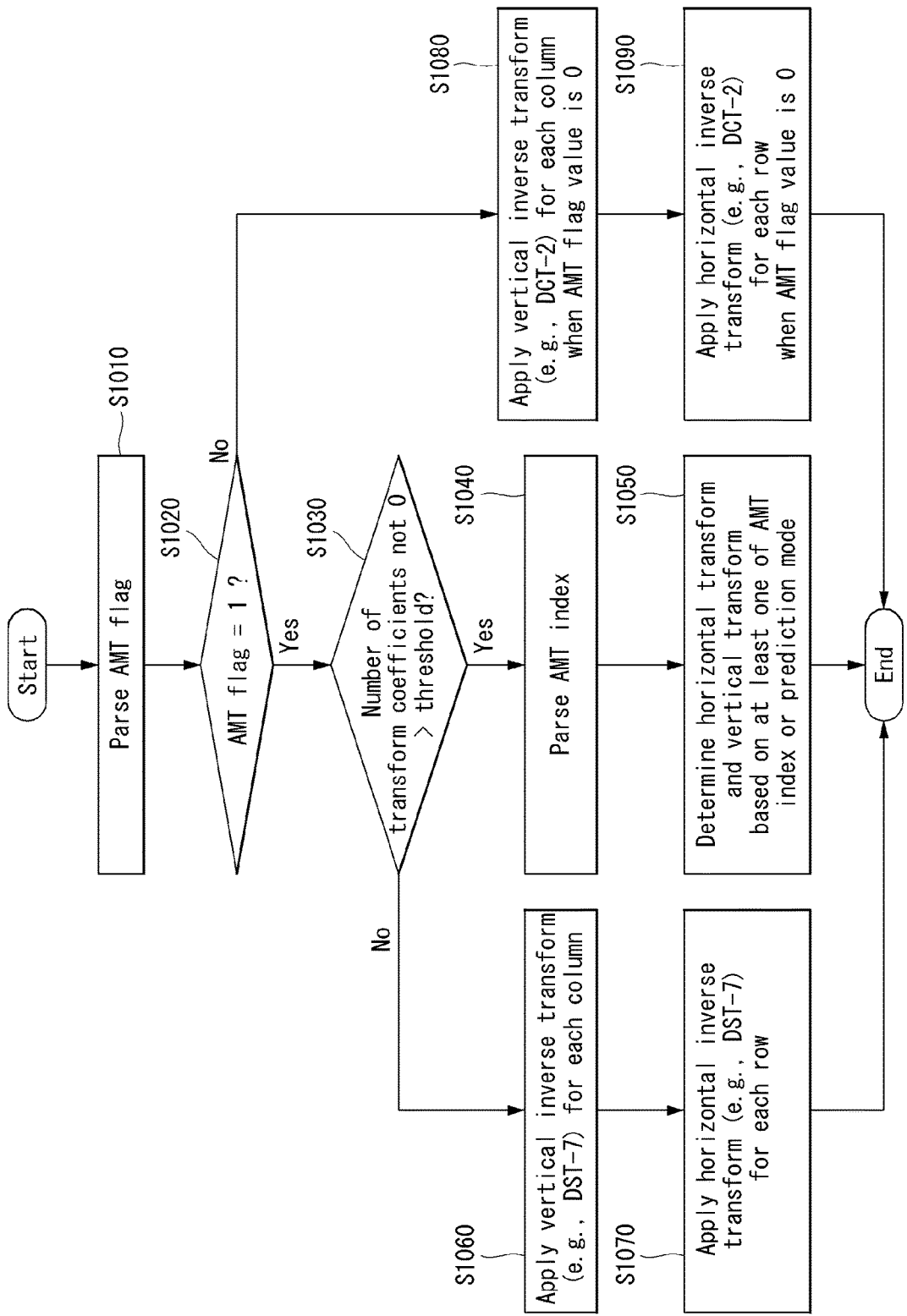
FIG. 10 is an embodiment to which the disclosure is applied and is a flowchart for describing a decoding process of applying a horizontal transform or vertical transform to a row or column based on an AMT flag and an AMT index.

FIG. 10 is an embodiment to which the disclosure is applied and is a flowchart for describing a decoding process of applying a horizontal transform or vertical transform to a row or column based on an AMT flag and an AMT index.

The decoder may parse an AMT flag from a bitstream (S1010). In this case, the AMT flag may indicate whether adaptive multiple transforms (AMT) is applied to a current block.

The decoder may check whether the adaptive multiple transforms (AMT) is applied to the current block based on the AMT flag (S1020). For example, the decoder may check whether the AMT flag is 1.

If the AMT flag is 1, the decoder may check whether the number of non-zero transform coefficient is greater than a threshold (or more) (S1030). For example, the threshold may be set to 2. This may be differently set based on a block size or the size of a transform unit.

If the number of non-zero transform coefficient is greater than the threshold, the decoder may parse the AMT index (S1040). In this case, the AMT index means an index indicating any one of a plurality of transform combinations for each intra prediction mode or inter prediction mode. The AMT index may be transmitted for each transform unit. Alternatively, the AMT index may mean an index indicating any one transform combination defined in a preset transform combination table. The preset transform combination table may mean FIG. 6, but the disclosure is not limited thereto.

The decoder may derive or determine a horizontal transform and a vertical transform based on at least one of the AMT index or a prediction mode (S1050).

Alternatively, the decoder may derive a transform combination corresponding to the AMT index. For example, the decoder may derive or determine a horizontal transform and vertical transform corresponding to the AMT index.

Meanwhile, if the number of non-zero transform coefficient is not greater than a threshold, the decoder may apply a preset vertical inverse transform to each column (S1060). For example, the vertical inverse transform may be an inverse transform of DST7.

Furthermore, the decoder may apply a preset horizontal inverse transform to each row (S1070). For example, the horizontal inverse transform may be an inverse transform of DST7. That is, if the number of non-zero transform coefficient is not greater than the threshold, a transform kernel preset in the encoder or the decoder may be used. For example, not the transform kernels defined in the transform combination table of FIG. 6, but commonly used transform kernels may be used.

Meanwhile, when the AMT flag is 0, the decoder may apply a preset vertical inverse transform to each column (S1080). For example, the vertical inverse transform may be an inverse transform of DCT-2.

Furthermore, the decoder may apply a preset horizontal inverse transform to each row (S1090). For example, the horizontal inverse transform may be an inverse transform of DCT-2. That is, when the AMT flag is 0, a transform kernel preset in the encoder or the decoder may be used. For example, not the transform kernels defined in the transform combination table of FIG. 6, but commonly used transform kernels may be used.

Figure 11:
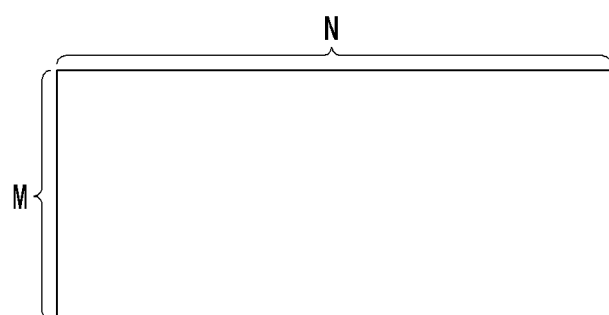
FIG. 11 is an embodiment to which the disclosure is applied and is a diagram for describing a method of differently configuring a transform corresponding to each row or column of a transform combination.

FIG. 11 is an embodiment to which the disclosure is applied and is a diagram for describing a method of differently configuring a transform corresponding to each row or column of a transform combination.

Embodiment (3): Method of Differently Configuring Transform Corresponding to Each Row or Column of Transform Combination In one embodiment of the disclosure, an N×N transform may be applied to an M×N 2 dimensional (2D) block in a horizontal (row) direction, and an M×M transform may be applied to an M×N 2D block in a vertical (column) direction.

In another embodiment, different transforms may be applied to M rows of FIG. 11, and different transforms may be applied to N columns of FIG. 11. All horizontal (row) transforms and vertical (column) transforms may be indicated as signs like Equation 16.

Horizontal(row)transforms: $T_{H,r}, r=0, \ldots, M-1$

Vertical(column)transforms: $T_{V,c}, c=0, \ldots, N-1$ [Equation 16]

The $T_{H,r}$ and $T_{V,c}$ may be elements belonging to respective designated transform sets. For example, as follows, assuming that $\Gamma_H^{N \times N}$ that is, a transform set for $T_{H,r}$, and $\Gamma_V^{M \times M}$, that is, a transform set for $T_{V,c}$, are present, Equation 17 and Equation 18 may be represented.

$\Gamma_H^{N \times N} = \{T_0^{N \times N} T_1^{N \times N} \ldots T_{P-1}^{N \times N}\}$ [Equation 17]

where $|\Gamma_H^{N \times N}|=P$ ($\Gamma_V^{M \times M}$을 이루는 원소의 수, cardinality (the number of elements forming $\Gamma_V^{M \times M}$ cardinality)

$\Gamma_V^{M \times M} = \{S_0^{M \times M} S_1^{M \times M} \ldots S_{Q-1}^{M \times M}\}$ [Equation 18]

where $|\Gamma_V^{M \times M}|=Q$ ($\Gamma_V^{M \times M}$ 을 이루는 원소의 수 cardinality) (the number of elements forming $\Gamma_V^{M \times M}$, cardinality)

In this case, $T_{H,r} \in \Gamma_H^{N \times N}$ $\forall r$ and $T_{H,c} \in \Gamma_V^{M \times M}$ $\forall c$ are established, and $T_{H,r}$ and $T_{V,c}$s may overlap. That is, they may have the same transform.

If all $T_{H,r}$ S are the same transform and $T_{V,c}$ s are also the same transform, a common 2D separable transform is obtained. If M=N, $\Gamma_H^{N \times N}$ and $\Gamma_V^{M \times M}$ may have a common element, that is, may have an intersection not a null set.

The examples of $\Gamma_H^{N \times N}$ and $\Gamma_V^{M \times M}$ are listed like Equations 19 to 21. For convenience sake, in the disclosure, it is assumed that $\Gamma_H^{N \times N}$ and $\Gamma_V^{M \times M}$ are hereinafter collectively called $\Gamma$, and an applied direction (horizontal or vertical) or transform size (M×M or N×N) may be checked by context.

$\Gamma = \{C_N^{II}, C_N^V, C_N^{VIII}, S_N^I, S_N^{VII}\}$ [Equation 19]

$\Gamma = \{C_N^{VIII}, S_N^{VII}\}$ [Equation 20]

$\Gamma = \{C_\cdot^{II}, C_\cdot^V, C_\cdot^{VIII}, S_\cdot^I, S_\cdot^{VII}\} = \{C^{II}, C^V, C^{VIII}, S^I, S^{VII}\}$ [Equation 21]

As in FIG. 6, $\Gamma$s may be different depending on a transform configuration group. Furthermore, $\Gamma$s may be different depending on the length of each side of a 2D block in addition to a transform configuration group. Different $\Gamma$s may be configured depending on a block shape.

In Equation 21, a transform size has not been designated (marked by •). This means that a size is not considered in selecting (or determining) a transform or a proper size is adaptively selected depending on a situation in which a transform is applied. For example, assuming that $C^{IV}$ has been selected, this may mean that $C_8^{IV}$ is applied if the length is 8 and $C_4^{IV}$ is used if the length is 4. For example, in FIG. 6, $\Gamma$ for the horizontal transform in G1 is $\Gamma = \{s^{VII}, s^I\}$.

FIG. 12 is an embodiment to which the disclosure is applied and is a diagram for describing a method of configuring a common transform configuration group based on at least one of a prediction mode, a block size or a block shape.

As described in FIG. 6, an j-th transform combination candidate for a transform configuration group $G_i$ has been indicated like (H($G_i$, j), V($G_i$, j)). In this case, H($G_i$, j) and V($G_i$, j) indicate respective applied horizontal transform and vertical transform.

In FIG. 6, the horizontal transform and vertical transform of each candidate have been indicated as an equation, such as H($G_i$, j)=DST7, because they are a single transform (e.g., DST7, DCT5). If different transforms may be applied to all row or columns, H($G_i$, j) and V($G_i$, j) may be represented as a tuple configured with M and N elements as in Equation 22.

$H(G_i, j) = (T_{j,0}, T_{j,1}, \ldots, T_{j,M-1})$ $V(G_i, j) = (S_{j,0}, S_{j,1}, \ldots, S_{j,N-1})$ [Equation 22]

In Equation 22, $T_{j,k}$, k=0, ..., M−1 may be selected from different $\Gamma$s, and may be designated from the same $\Gamma$. The same is applied to $S_{j,k}$, k=0, ..., N−1. A table for configuring a common transform configuration group using the notation in Equation 22 is shown in FIG. 12.

The transform configuration group of FIG. 12 may be configured based on a prediction mode as in FIG. 6, and may be configured based on a combination of at least one of a prediction mode, a block size or a block shape. For example, transform candidates applied to a 4×8 residual block generated by the intra prediction mode 0 (planar mode) may be assigned as Group 0. In this case, H($G_0$, j) is a tuple configured with four 8×8 transforms, and V($G_0$, j) is a tuple configured with eight 4×4 transforms.

Transform configuration groups may be configured by distinguishing between all the cases at once as in FIG. 12, but transform configuration groups may be combined by dividing them into a plurality of tables.

FIGS. 13 and 14 are embodiments to which the disclosure is applied and are tables for describing a method of dividing transform configuration groups into a plurality of tables based on at least one of a prediction mode, a block size or a block shape and combining the transform configuration groups.

FIG. 13 shows a group configuring a row transform (or horizontal transform), and FIG. 14 shows a group configuring a column transform (or vertical transform).

In one embodiment of the disclosure, there is provided a method for division into a table for a row transform configuration and a table for a column transform configuration.

If the encoder transmits a transform index indicating which transform combination will be used, it may separately signal a row transform index for designating a row transform (H(H$G_i$, j)) and a column transform index indicating a column transform (V(V$G_i$, j)) or may signal one transform index including two pieces of index information.

In FIGS. 13 and 14, only the tables for a 4×4 transform are provided, but the disclosure is not limited thereto. For example, different transform configuration group tables may be defined for other sizes (e.g., 8×8 and 32×32).

If a transform is applied to a 16×8 block, reference is made to an 8×8 horizontal transform table in the horizontal direction and to a 16×16 vertical transform table in the vertical direction.

FIG. 15 is an embodiment to which the disclosure is applied and illustrates an example in which a transform configuration group is configured using one transform set.

Embodiment (4): Method of Configuring Transform Configuration Group Using One Transform Set As described in Embodiment (1) of FIG. 6, DST7 and a modified form of DST7 may be used as the transform set Γ. The same Γ may be applied to a tuple ($H(G_i, j)$) for all of horizontal transforms and a tuple ($V(G_i, j)$) for all of vertical transforms. In this case, in the transforms configuring the transform set Γ, a corresponding size may be selected according to circumstances regardless of transform sizes (4×4 and 8×8). Related available transform sets Γ may be listed like Equation 23.

$$\Gamma=\{S_\cdot^{VII}, S_\cdot^{VII,A}\}$$

$$\Gamma=\{S_\cdot^{VII}, S_\cdot^{VII,AR}\}$$

$$\Gamma=\{S_\cdot^{VII}, S_\cdot^{VII,R}\} \quad \text{[Equation 23]}$$

In this case, a superscript A is an abbreviation of alternate and indicates that a sign is alternately changed. A superscript R means that order of vectors is changed, and a superscript AR means that the two types are applied.

In Equation 23, $S_\cdot^{VII,A}$, $S_\cdot^{VII,AR}$, $S_\cdot^{VII,R}$ do not practically require the addition of separate kernel coefficient data because the same kernel coefficient data as $S_\cdot^{VII}$ is used.

Furthermore, in a common codec, DCT2 may be included in the transform set Γ without the addition of a memory because DCT2 is already included. Examples of the transform set Γ including DCT2 are shown in Equation 24.

$$\Gamma=\{S_\cdot^{VII}, S_\cdot^{VII,A}, C_\cdot^{II}\}$$

$$\Gamma=\{S_\cdot^{VII}, S_\cdot^{VII,AR}, C_\cdot^{II}\}$$

$$\Gamma=\{S_\cdot^{VII}, S_\cdot^{VII,R}, C_\cdot^{II}\} \quad \text{[Equation 24]}$$

A transform configuration group may be configured like FIG. 6 or FIG. 12 using the transform sets Γ in Equation 23 or Equation 24.

For example, if a transform configuration group is configured like FIG. 6, this indicates a method of applying the same horizontal transform to all the rows and the same vertical transform to all columns with respect to a block.

Furthermore, in FIG. 6, a transform corresponding to the size of a corresponding block has only to be selected with respect to a designated transform because a table is not different depending on the shape or size of a block. If a transform configuration group is configured like FIG. 6, in order to reduce a memory necessary to store transform kernel coefficient data, one of the transform sets Γ proposed in Equation 23 may be selected and the candidates of all of transform configuration groups may be described or one of the transform sets Γ proposed in Equation 24 may be selected and the candidates of all of transform configuration groups may be determined.

FIG. 15 illustrates an example in which the transform combinations of all of transform configuration groups are described using only the transform set $\Gamma=\{S_\cdot^{VII}, S_\cdot^{VII,R}\}$.

Hereinafter, FIG. 16 describes an example in which a transform configuration group is configured using different transform sets based on a transform block size.

FIG. 16 is an embodiment to which the disclosure is applied and illustrates an example in which a transform configuration group is configured using different transform sets based on a transform block size.

As an example in which a transform configuration group is configured using the method of FIG. 12, FIG. 16 illustrates a case where a transform set $\Gamma=\{S_4^{VII}, S_4^{VII,R}, C_4^{II}\}$ is used in the case of a 4×4 transform and a transform set $\Gamma=\{S_8^{VII}, S_8^{VII,R}, C_8^{II}\}$ is used in the case of an 8×8 transform.

For example, in FIG. 16, Group 0 corresponds to an 8×4 block to which the planar mode and the DC mode are applied.

In one embodiment of the disclosure, assuming that DST4 can be used instead of DST7 as in Embodiment (2), the transform set Γ may be set using the same method as Equations 23 and 24. Equation 25 indicates examples in which only $S_\cdot^{IV}$ is used as transform kernel coefficient data, and Equation 26 shows examples in which $S_\cdot^{IV}$ and $C_\cdot^{II}$ are used as transform kernel coefficient data.

$$\Gamma=\{S_\cdot^{IV}, S_\cdot^{IV,A}\}$$

$$\Gamma=\{S_\cdot^{IV}, S_\cdot^{IV,AR}\}$$

$$\Gamma=\{S_\cdot^{IV}, S_\cdot^{IV,R}\} \quad \text{[Equation 25]}$$

$$\Gamma=\{S_\cdot^{IV}, S_\cdot^{IV,A}, C_\cdot^{II}\}$$

$$\Gamma=\{S_\cdot^{IV}, S_\cdot^{IV,AR}, C_\cdot^{II}\}$$

$$\Gamma=\{S_\cdot^{IV}, S_\cdot^{IV,R}, C_\cdot^{II}\} \quad \text{[Equation 26]}$$

Likewise, transform combinations, such as FIG. 15 or FIG. 16, may be configured using the transform sets Γ proposed in Equations 25 and 26. If a transform configuration group is different depending on a block size or a block shape, a transform set Γ corresponding to the block size has only to be used.

Basically, a transform set Γ may include any transforms. For example, as in Equation 27, a transform set Γ may be configured by including all transforms related to $S_\cdot^{VII}$ and $S_\cdot^{IV}$. Alternatively, as in Equation 28, a transform set Γ may be configured by including all types of cosine transforms/sine transforms. Alternatively, as in Equation 29, a transform set Γ may be configured by including a Karhunen Loeve transform (KLT) or a sparse orthonormal transform (SOT) obtained from training data.

$$\Gamma=\{S_\cdot^{VII}, S_\cdot^{VII,R}, S_\cdot^{IV}, S_\cdot^{IV,R}\}$$

$$\Gamma=\{S_\cdot^{VII}, S_\cdot^{VII,R}, S_\cdot^{IV}, S_\cdot^{IV,R}, C_\cdot^{II}\} \quad \text{[Equation 27]}$$

$$\Gamma=\{S_\cdot^{I}, S_\cdot^{II}, S_\cdot^{III}, S_\cdot^{IV}, S_\cdot^{V}, S_\cdot^{VI}, S_\cdot^{VII}, S_\cdot^{VIII}, C_\cdot^{I}, C_\cdot^{II}, C_\cdot^{III}, C_\cdot^{IV}, C_\cdot^{V}, C_\cdot^{VI}, C_\cdot^{VII}, C_\cdot^{VIII}\} \quad \text{[Equation 28]}$$

$$\Gamma=\{S_\cdot^{VII}, S_\cdot^{VII,R}, C_\cdot^{II}, KLT_1, KLT_2\}$$

$$\Gamma=\{S_\cdot^{VII}, S_\cdot^{VII,R}, C_\cdot^{II}, SOT_1, SOT_2\}$$

$$\Gamma=\{KLT_1, KLT_2, KLT_3, KLT_4\}$$

$$\Gamma=\{SOT_1, SOT_2, SOT_3\} \quad \text{[Equation 29]}$$

Furthermore, in the disclosure, it is assumed that basically, transforms are separately applied to a horizontal direction and a vertical direction, but a transform set Γ may be configured with non-separable transforms and separable transforms and non-separable transforms may be mixed and configured according to circumstances.

In the case of the mixed configuration, if a non-separable transform is selected, selecting transform for each row/column or for each horizontal/vertical direction is not necessary. The transform combinations proposed through the aforementioned embodiments may be configured only if separable transforms are selected.

Embodiments of the disclosure may be applied regardless of a primary transform or a secondary transform. That is, there is no limit that the embodiments must be applied to any one of a primary transform or a secondary transform and may be applied to them.

Figures 17, 18:
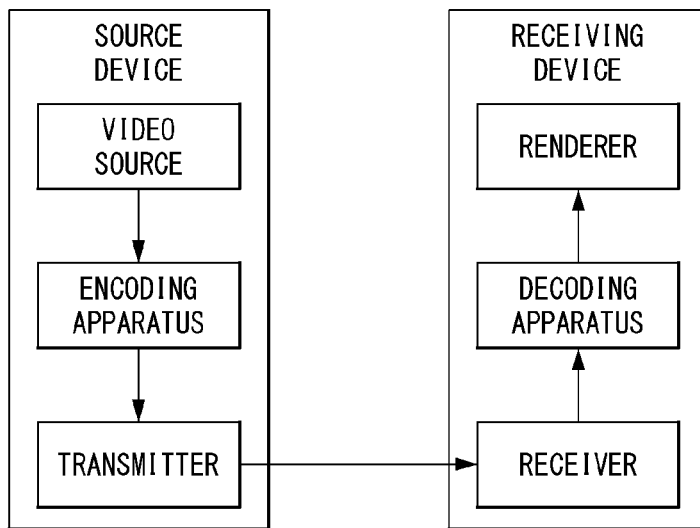
FIG. 17 is an embodiment to which the disclosure is applied and illustrates an example in which a spanned set is configured.
FIG. 18 illustrates a video coding system to which the disclosure is applied.

FIG. 17 is an embodiment to which the disclosure is applied and illustrates an example in which a spanned set is configured.

Embodiment (5): Configure Spanned Set

An equation for a cosine transform applied in the disclosure is the same as Equation 30.

[Equation 30]

$$(C_N^I)_{lk} = \gamma_k \gamma_l \sqrt{\frac{2}{N-1}} \cos\left(kl\frac{\pi}{N-1}\right),$$
$$k, l = 0, 1, \ldots, N-1$$

$$(C_N^{II})_{lk} = \sqrt{\frac{2}{N}} \sigma_k \cos\left[\left(l+\frac{1}{2}\right)\frac{k\pi}{N}\right],$$
$$k, l = 0, 1, \ldots, N-1$$

$$(C_N^{III})_{lk} = \sqrt{\frac{2}{N}} \sigma_l \cos\left[l\left(k+\frac{1}{2}\right)\frac{\pi}{N}\right],$$
$$k, l = 0, 1, \ldots, N-1$$

$$(C_N^{IV})_{lk} = \sqrt{\frac{2}{N}} \cos\left[\left(l+\frac{1}{2}\right)\left(k+\frac{1}{2}\right)\frac{\pi}{N}\right],$$
$$k, l = 0, 1, \ldots, N-1$$

$$(C_N^V)_{lk} = \frac{2}{\sqrt{2N-1}} \sigma_l \sigma_k \cos\left[kl\left(\frac{2\pi}{2N-1}\right)\right],$$
$$k, l = 0, 1, \ldots, N-1$$

$$(C_N^{VI})_{lk} = \frac{2}{\sqrt{2N-1}} \sigma_k \varepsilon_l \cos\left[\left(l+\frac{1}{2}\right)k\frac{2\pi}{2N-1}\right],$$
$$k, l = 0, 1, \ldots N-1$$

$$(C_N^{VII})_{lk} = \frac{2}{\sqrt{2N-1}} \varepsilon_k \sigma_l \cos\left[l\left(k+\frac{1}{2}\right)\frac{2\pi}{2N-1}\right],$$
$$k, l = 0, 1, \ldots N-1$$

$$(C_N^{VIII})_{lk} = \frac{2}{\sqrt{2N+1}} \cos\left[\left(l+\frac{1}{2}\right)\left(k+\frac{1}{2}\right)\frac{2\pi}{2N+1}\right],$$
$$k, l = 0, 1, \ldots N-1$$

where $\gamma_l = \frac{1}{\sqrt{2}}$ for $l = 0$ or $N-1$, $\sigma_l = \frac{1}{\sqrt{2}}$ for $l = 0$, and $\varepsilon_l = \frac{1}{2}$ for $l = N-1$ In this case, $\gamma_1$, $\sigma_1$, $\varepsilon_1$ has a value of 1 in cases other than the values. That is, it has a 1 value by default.

Furthermore, an equation for a sine transform applied in the disclosure is the same as Equation 31.

[Equation 31]

$$(S_N^I)_{lk} = \sqrt{\frac{2}{N-1}} \sin\left[(l+1)(k+1)\frac{\pi}{N+1}\right],$$
$$k, l = 0, 1, \ldots, N-1$$

$$(S_N^{II})_{lk} = \sqrt{\frac{2}{N}} \varepsilon_k \sin\left[\left(l+\frac{1}{2}\right)(k+1)\frac{\pi}{N}\right],$$
$$k, l = 0, 1, \ldots, N-1$$

$$(S_N^{III})_{lk} = \sqrt{\frac{2}{N}} \varepsilon_l \sin\left[(l+1)\left(k+\frac{1}{2}\right)\frac{\pi}{N}\right],$$
$$k, l = 0, 1, \ldots, N-1$$

$$(S_N^{IV})_{lk} = \sqrt{\frac{2}{N}} \sin\left[\left(l+\frac{1}{2}\right)\left(k+\frac{1}{2}\right)\frac{\pi}{N}\right],$$
$$k, l = 0, 1, \ldots, N-1$$

$$(S_N^V)_{lk} = \frac{2}{\sqrt{2N+1}} \sin\left[(l+1)(k+1)\frac{2\pi}{2N+1}\right],$$
$$k, l = 0, 1, \ldots, N-1$$

$$(S_N^{VI})_{lk} = \frac{2}{\sqrt{2N+1}} \sin\left[\left(l+\frac{1}{2}\right)(k+1)\frac{2\pi}{2N+1}\right],$$
$$k, l = 0, 1, \ldots, N-1$$

$$(S_N^{VII})_{lk} = \frac{2}{\sqrt{2N+1}} \sin\left[(l+1)\left(k+\frac{1}{2}\right)\frac{2\pi}{2N+1}\right],$$
$$k, l = 0, 1, \ldots, N-1$$

$$(S_N^{VIII})_{lk} = \frac{2}{\sqrt{2N-1}} \varepsilon_l \varepsilon_k \sin\left[\left(l+\frac{1}{2}\right)\left(k+\frac{1}{2}\right)\frac{2\pi}{2N-1}\right],$$
$$k, l = 0, 1, \ldots, N-1$$

where $\varepsilon_l = \frac{1}{\sqrt{2}}$ for $l = N-1$

In this case, $\varepsilon_k$, $\varepsilon_l$ has a 1 value in cases other than the values. That is, it has a 1 value by default.

Relation equations of Equation 32, including the relation with $C_N^{VIII}$ and $S_N^{VII}$ proposed through Embodiments (1) and (2) and the relation with $C_N^{IV}$ and $S_N^{VI}$ may be derived from equations for cosine transforms and sine transforms.

$$C_N^{II} = D_N S_N^{II} J_N \ (C_N^{II})^T = J_N (S_N^{II})^T D_N$$

$$C_N^{III} = J_N S_N^{III} D_N \ (C_N^{III})^T = D_N (S_N^{III})^T J_N$$

$$C_N^{IV} = J_N S_N^{IV} D_N \ (C_N^{IV})^T = D_N (S_N^{IV})^T J_N$$

$$C_N^V = J_N C_N^{VI} D_N \ (C_N^V)^T = D_N (C_N^{VI})^T J_N$$

$$C_N^V = D_N C_N^{VII} J_N \ (C_N^V)^T = J_N (C_N^{VII})^T D_N$$

$$C_N^{VI} = J_N C_N^V D_N \ (C_N^{VI})^T = D_N (C_N^V)^T J_N$$

$$C_N^{VI} = D_N S_N^{VIII} J_N \ (C_N^{VI})^T = J_N (S_N^{VIII})^T D_N$$

$$C_N^{VII} = D_N C_N^V J_N \ (C_N^{VII})^T = J_N (C_N^V)^T D_N$$

$$C_N^{VII} = J_N S_N^{VIII} D_N \ (C_N^{VII})^T = D_N (S_N^{VIII})^T J_N$$

$$C_N^{VIII} = J_N S_N^{VII} D_N \ (C_N^{VIII})^T = D_N (S_N^{VII})^T J_N$$

$$C_N^{VIII} = D_N S_N^{VI} J_N \ (C_N^{VIII})^T = J_N (S_N^{VI})^T D_N$$

$$S_N^{II} = D_N C_N^{II} J_N \ (S_N^{II})^T = J_N (C_N^{II})^T D_N$$

$$S_N^{III} = J_N C_N^{III} D_N \ (S_N^{III})^T = D_N (C_N^{III})^T J_N$$

$S_N^{IV} = J_N C_N^{IV} D_N (S_N^{IV})^T = D_N (C_N^{III})^T J_N$ $S_N^V = J_N S_N^{VI} D_N (S_N^V)^T = D_N (S_N^{VI})^T J_N$ $S_N^V = D_N S_N^{VII} J_N (S_N^V)^T = J_N (S_N^{VII})^T D_N$ $S_N^{VI} = J_N S_N^V D_N (S_N^{VI})^T = D_N (S_N^V)^T J_N$ $S_N^{VI} = D_N C_N^{VIII} J_N (S_N^{VI})^T = J_N (C_N^{VIII})^T D_N$ $S_N^{VII} = D_N S_N^V J_N (S_N^{VII})^T = J_N (S_N^V)^T D_N$ $S_N^{VII} = J_N C_N^{VIII} D_N (S_N^{VII})^T = D_N (C_N^{VIII})^T J_N$ $S_N^{VIII} = D_N C_N^{VI} J_N (S_N^{VIII})^T = J_N (C_N^{VI})^T D_N$ $S_N^{VIII} = J_N C_N^{VII} D_N (S_N^{VIII})^T = D_N (C_N^{VII})^T J_N$  [Equation 32]

Furthermore, relation equations, such as Equation 33, may be derived from the relation equations of Equation 32.

$C_N^V = J_N D_N S_N^{VIII} J_N D_N (C_N^V)^T = D_N J_N (S_N^{VIII})^T D_N J_N$ $C_N^{VI} = J_N D_N S_N^{VII} J_N D_N (C_N^{VI})^T = D_N J_N (C_N^{VII})^T D_N J_N$ $C_N^{VII} = D_N J_N C_N^{VI} D_N J_N (C_N^{VII})^T = J_N D_N (C_N^{VI})^T J_N D_N$ $C_N^{VIII} = D_N J_N S_N^V D_N J_N (C_N^{VIII})^T = J_N D_N (S_N^V)^T J_N D_N$ $S_N^V = J_N D_N C_N^{VIII} J_N D_N (S_N^V)^T = D_N J_N (C_N^{VIII})^T D_N J_N$ $S_N^{VI} = J_N D_N S_N^{VII} J_N D_N (S_N^{VI})^T = D_N J_N (S_N^{VII})^T D_N J_N$ $S_N^{VII} = D_N J_N S_N^{VI} D_N J_N (S_N^{VII})^T = J_N D_N (S_N^{VI})^T J_N D_N$ $S_N^{VIII} = D_N J_N C_N^V D_N J_N (S_N^{VIII})^T = J_N D_N (C_N^V)^T J_N D_N$  [Equation 33]

The calculation of $D_N J_N$ and $J_N D_N$ appearing in Equation 33 may be performed by properly combining the patterns of sequence inversion and sign inversion for input a sin Equation 34.

$D_N J_N x = [(-1)^0 x_{N-1} (-1)^1 x_{N-2} \ldots (-1)^{N-1} x_0]^T$ $J_N D_N x = [(-1)^{N-1} x_{N-1} (-1)^{N-2} x_{N-2} \ldots (-1)^0 x_0]^T$  [Equation 34]

Accordingly, several other transforms may be derived using only kernel coefficient data for a single specific transform from the relation equations of Equations 32 and 33. Equation 35 represents, as a set, transforms that may be spanned from one transform.

$\text{Span}(C^I) = \{C^I\}$ $\text{Span}(C^{II}) = \{C^{II}, S^{II}\}$ $\text{Span}(C^{III}) = \{C^{III}, S^{III}\}$ $\text{Span}(C^{IV}) = \{C^{IV}, S^{IV}\}$ $\text{Span}(C^V) = \{C^V, C^{VI}, C^{VII}, S^{VIII}\}$ $\text{Span}(C^{VI}) = \{C^V, C^{VI}, C^{VII}, S^{VIII}\}$ $\text{Span}(C^{VII}) = \{C^V, C^{VI}, C^{VII}, S^{VIII}\}$ $\text{Span}(C^{VIII}) = \{C^{VIII}, S^V, S^{VI}, S^{VII}\}$ $\text{span}(S^I) = \{S^I\}$ $\text{Span}(S^{II}) = \{C^{II}, S^{II}\}$ $\text{Span}(S^{III}) = \{C^{III}, S^{III}\}$ $\text{Span}(S^{IV}) = \{C^{IV}, S^{IV}\}$ $\text{Span}(S^V) = \{C^{VIII}, S^V, S^{VI}, S^{VII}\}$ $\text{Span}(S^{VI}) = \{C^{VIII}, S^V, S^{VI}, S^{VII}\}$ $\text{Span}(S^{VII}) = \{C^{VIII}, S^V, S^{VI}, S^{VII}\}$ $\text{Span}(S^{VIII}) = \{C^V, C^{VI}, C^{VII}, S^{VIII}\}$  [Equation 35]

A corresponding power set for each span set proposed in Equation 35 may be calculated. For example, a power set $P(\text{Span}(C^V))$ for $\text{Span}(C^V)$ may be represented like Equation 36.

$P(\text{Span}(C^V)) = \{\phi, \{C^V\}, \{C^{VI}\}, \{C^{VII}\}, \{S^{VIII}\}, \{C^V, C^{VI}\}, \{C^V, C^{VII}\}, \{C^V, S^{VIII}\}, \{C^{VI}, C^{VII}\}, \{C^{VI}, S^{VIII}\}, \{C^V, C^{VI}, C^{VII}\}, \{C^V, C^{VI}, S^{VIII}\}, \{C^V, C^{VII}, S^{VIII}\}, \{C^{VI}, C^{VII}, S^{VIII}\}, \{C^V, C^{VI}, C^{VII}, S^{VIII}\}\}$  [Equation 36]

If one element of a power set for a span set called A is indicated as $e(A) \in P(\text{Span}(A))$ it may be represented like Equation 37.

$$\Gamma = \bigcup_{i=1}^{VIII} e(C^i) \cup \bigcup_{j=1}^{VIII} e(S^j), \Gamma \neq \phi$$  [Equation 37]

The transform set $\Gamma$ defined in Embodiments (2) and (3) may be configured like Equation 37. $e(\cdot)$ appearing in Equation 37 may not be disjointed because elements overlapped between power sets for the span sets in Equation 35 are present.

The number of transforms that need to be stored in an actual memory space in the form of coefficient data may be much smaller because one transform can be spanned to several transforms as in Equation 35. For example, two transforms are sufficient to span $\Gamma = \{C^V, C^{VI}, C^{VII}, C^{VIII}, S^V, S^{VI}, S^{VII}, S^{VIII}\}$, and $\{C^V, S^{VII}\}$ is possible as one of several combinations.

In most of codec system, it has been known that in general $S^{VII}$ is efficient for residual data generated from an intra prediction because $C^{II}$ is included. If $S^{VII}$ can be substituted with $S^{IV}$ as in Embodiment (2), a maximum transform set capable of being spanned from transforms, that is, a seed, may be generated as in FIG. 17.

The maximally spanned set proposed in FIG. 17 is a set of transforms which may be used to a maximum extent. When the maximally spanned set is used as a transform set $\Gamma$, a partial set of FIG. 17 may be used.

A span set for $S^{VII}$ and $(S^{VII})^T$ from the relation equations of Equations 32 and 33 may be represented using $J_N$ and $D_N$ as in Equation 38. In this case, $J_N$ and $D_N$ are defined in Equation 4.

$$\text{Span}(S^{VII}) = \{C^{VIII}, S^V, S^{VI}, S^{VII}\}$$
$$= \{J_N S_N^{VII} D_N, D_N S_N^{VII} J_N, J_N D_N S_N^{VII} J_N D_N, S_N^{VII}\}$$

$$\text{Span}((S^{VII})^T) = \{D_N (S_N^{VII})^T J_N, J_N (S_N^{VII})^T D_N, D_N J_N (S_N^{VII})^T D_N J_N, (S_N^{VII})^T\}$$  [Equation 38]

Embodiment (1) proposes an example in which $S^{VII}$, $_R = J_N S_N^{VII}$ is used instead of $C^{VII}$ as in Equation 7. In this case, there is an effect in that the sign of a coefficient generated when a forward transform (e.g., $(S_N^{VII})^T$) is applied is used without being inverted. If the same method is applied to Equation 38, a corresponding spanned set is changed as in Equation 39 because $D_N$ multiplied at the front of a forward transform is eliminated.

$$\text{Span}((S^{VII})^T) = \{(S_N^{VII})^T J_N, J_N(S_N^{VII})^T, D_N, J_N(S_N^{VII})^T, D_N J_N, (S_N^{VII})^T\}$$

$$\text{Span}(S^{VII}) = \{J_N S_N^{VII}, D_N S_N^{VII} J_N, J_N D_N S_N^{VII} J_N, S_N^{VII}\} \quad \text{[Equation 39]}$$

Accordingly, even in the span sets listed in Equation 35 and FIG. 17, all transforms included in each span set may be represent as a linear relation of $J_N$ and $D_N$ and a seed transform like Equation 38 using the relation equations in Equations 32 and 33. Thereafter, a forward transform is calculated as in Equation 39. If the front $D_N$ is eliminated, a span sets configured with transforms whose signs of transform coefficients are not inverted can be derived. A desired transform set $\Gamma$ may be configured based on the relation equation of Equation 37 using the obtained span sets.

From Equation 38, it may be seen that a seed transform called $S_N^{VII}$ is placed at the center and transforms are spanned by properly multiplying $J_N$ and $D_N$ before and behind. It may be seen that in matrices multiplied before, output obtained after the seed transform at the center is applied is post-processed. Furthermore, it may be seen that n matrices multiplied behind, pre-processing is performed on input before the seed transform at the center is applied. Results obtained by multiplying $J_N$ and $D_N$ several times in various combinations may be summarized as in Equation 40.

$$cAB, \text{ where } c=+1 \text{ or } -1, A=I(\text{identity matrix}) \text{ or } D_N, \text{ and } B=I \text{ or } J_N \quad \text{[Equation 40]}$$

Accordingly, 64 cases occur for two combinations because 8 cases are possible for each of pre-processing and post-processing with respect to one seed transform. However, if both a C value on the pre-processing side and a c value on the post-processing side are considered, overlapped cases occurs (i.e., because a sign change finally results in two cases of +/−), the number of cases is a total of 32 cases. If only the sign change aspect of transform results is considered and a sign value itself is neglected, the total number of cases is 16 because the c value can be fixed to 1 in Equation 40. An example in which Equation 40 is applied to both pre-processing and post-processing includes Equation 41.

$$\text{Span}(S_N^{VII}) = \{S_N^{VII}, -S_N^{VII}, S_N^{VII} J_N, \\ -S_N^{VII} J_N, S_N^{VII} D_N, -S_N^{VII} D_N, S_N^{VII} D_N J_N, \\ -S_N^{VII} D_N J_N, J_N S_N^{VII}, -J_N S_N^{VII}, J_N S_N^{VII} J_N, \\ -J_N S_N^{VII} J_N, J_N S_N^{VII} D_N, -J_N S_N^{VII} D_N, \\ J_N S_N^{VII} D_N J_N, -J_N S_N^{VII} D_N J_N, D_N S_N^{VII}, -D_N S_N^{VII}, \\ D_N S_N^{VII} J_N, -D_N S_N^{VII} J_N, D_N S_N^{VII} D_N, -D_N S_N^{VII} D_N J_N, \\ D_N D_N S_N^{VII} D_N J_N, -D_N D_N S_N^{VII} D_N J_N D_N J_N S_N^{VII}, \\ -D_N J_N S_N^{VII}, D_N J_N S_N^{VII} J_N, -D_N J_N S_N^{VII} J_N, \\ D_N J_N S_N^{VII} D_N, -D_N J_N S_N^{VII} D_N J_N S_N^{VII} D_N J_N, \\ -D_N J_N S_N^{VII} D_N J_N\} \quad \text{[Equation 41]}$$

An example for a case where a c value is not considered with respect to the example of Equation 41 includes Equation 42.

$$\text{Span}(S_N^{VII}) = \{S_N^{VII}, S_N^{VII} J_N, S_N^{VII} D_N, S_N^{VII} D_N J_N, \\ J_N S_N^{VII}, J_N S_N^{VII} J_N, J_N S_N^{VII} D_N, J_N S_N^{VII} D_N J_N, \\ D_N S_N^{VII}, D_N S_N^{VII} J_N, D_N S_N^{VII} D_N, D_N S_N^{VII} D_N J_N, \\ D_N J_N S_N^{VII}, D_N J_N S_N^{VII} J_N, D_N J_N S_N^{VII} D_N, \\ D_N J_N S_N^{VII} D_N J_N\} \quad \text{[Equation 42]}$$

If the sign of transform coefficients obtained by applying a forward transform as in Equation 39 is neglected, the total number of cases is reduced to 8 because a combination of $J_N$ and $D_N$ is used without any change on the input pre-processing side and only $J_N$ has only to be used on the output post-processing with respect to a forward transform. Equation 43 shows a corresponding example.

$$\text{Span}((S_N^{VII})^T) = \{(S_N^{VII})^T, (S_N^{VII})^T J_N, (S_N^{VII})^T D_N, \\ (S_N^{VII})^T D_N J_N, J_N (S_N^{VII})^T, J_N (S_N^{VII})^T J_N, \\ J_N (S_N^{VII})^T D_N, J_N (S_N^{VII})^T D_N J_N\}$$

$$\text{Span}(S_N^{VII}) = \{S_N^{VII}, J_N S_N^{VII}, D_N S_N^{VII}, J_N D_N S_N^{VII}, \\ S_N^{VII} J_N, J_N S_N^{VII} J_N, D_N S_N^{VII} J_N, J_N D_N S_N^{VII} J_N\} \quad \text{[Equation 43]}$$

In the disclosure, a span set may be derived as in Equation 43 with respect to all cosine transforms/sine transforms. Each corresponding power set may be configured as in Equation 36. A transform set $\Gamma$ to be used to determine a transform combination may be configured through Equation 37.

Furthermore, methods of configuring several transform combinations proposed in Embodiment (3) may be applied using the transform sets $\Gamma$ derived from the methods proposed in Embodiment (4).

A method of adding an input pre-processing step and output post-processing step to one transform in various forms as in Equations 40 to 43 is not applied to only trigonometric transforms as in Equations 41 to 43, but is also applied to other given transforms (e.g., KLT and SOT), and thus a corresponding span set can be derived.

Furthermore, in Equations 40 to 43, a matrix corresponding to the pre- and post-processing steps has been configured with only a combination of $J_N$ and $D_N$ but any other matrices other than $J_N$ and $D_N$ may be configured through computation of any form.

FIG. 18 illustrates a video coding system to which the disclosure is applied.

The video coding system may include a source device and a receiving device. The source device may transmit, to the receiving device, encoded video/image information or data through a digital storage medium or over a network in a file or streaming form.

The source device may include a video source, an encoding apparatus, and a transmitter. The receiving device may include a receiver, a decoding apparatus and a renderer. The encoding apparatus may be called a video/image encoding apparatus. The decoding apparatus may be called a video/image decoding apparatus. The transmitter may be included in the encoding apparatus. The receiver may be included in the decoding apparatus. The renderer may include a display. The display may be configured for each device or external component.

The video source may obtain a video/image through the capture, synthesis or generation process of a video/image. The video source may include a video/image capture device and/or a video/image generation device. The video/image capture device may include one or more cameras, a video/image archive including a previously captured video/image, etc., for example. The video/image generation device may include a computer, a tablet and a smartphone, for example, and may (electronically) generate a video/image. For example, a virtual video/image may be generated through a computer. In this case, a process of generating related data may be substituted with a video/image capture process.

The encoding apparatus may encode an input image/image. The encoding apparatus may perform a series of procedures, such as prediction, a transform, and quantization, for compression and coding efficiency. Encoded data (encoded video/image information) may be output in a bitstream form.

The transmitter may transmit, to the receiver of the receiving device, encoded video/image information or data output in a bitstream form through a digital storage medium or over a network in a file or streaming form. The digital storage medium may include various storage media, such as a USB, an SD, a CD, a DVD, Blu-ray, an HDD, and an SSD. The transmitter may include an element for generating a media file through a predefined file format, and may include an element for transmission over a broadcast/communication network. The receiver may extract the bitstream and transmit it to the decoding apparatus.

The decoding apparatus may decode a video/image by performing a series of procedures, such as de-quantization, an inverse transform, and prediction corresponding to operations of the encoding apparatus.

The renderer may render a decoded video/image. The rendered video/image may be displayed through a display.

Figure 19:
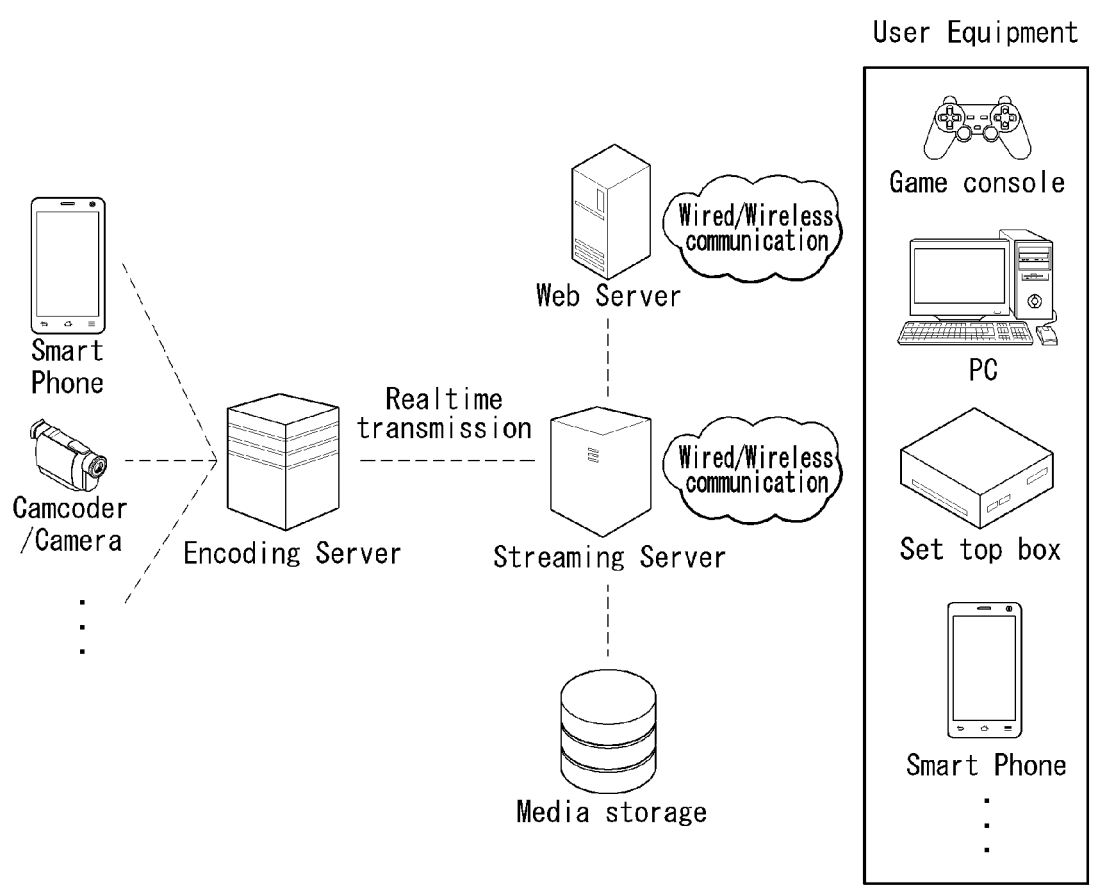
FIG. 19 illustrates a content streaming system to which the disclosure is applied.

FIG. 19 illustrates a content streaming system to which the disclosure is applied.

Referring to FIG. 19, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR.

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method of decoding a video signal based on adaptive multiple transforms (AMT), the method comprising:
   determining one transform configuration group of a plurality of transform configuration groups based on a prediction mode, wherein each of the plurality of transform configuration groups includes a plurality of transform combinations;
   obtaining an AMT flag from the video signal, wherein the AMT flag is used for representing whether the AMT is performed;
   obtaining an AMT index from the video signal based on the AMT flag, wherein the AMT index (i) indicates any one of a plurality of transform combinations of the one transform configuration group of the plurality of transform configuration groups, (ii) is a single transform index corresponding to a first index value for a horizontal transform and a second index value for a vertical transform, and (iii) is comprised of values of 0, 1, 2, 3, 4, wherein the first index value and the second index value are determined based on the AMT index and the one transform configuration group;
   deriving a transform combination corresponding to the AMT index, wherein the transform combination is configured with a horizontal transform and a vertical transform and includes at least one of discrete sine transform type 7 (DST-7) or discrete cosine transform type 8 (DCT-8);

performing an inverse transform on a transform unit based on the transform combination; and reconstructing the video signal based on the transform unit, wherein a matrix for the inverse transform is derived based on a type of the transform combination and a size of the transform unit being 32 or less.

2. The method of claim 1, wherein the transform combination is selected based on at least one of a prediction mode, a size or a shape of the transform unit.

3. The method of claim 1, further comprising:

checking whether a number of non-zero transform coefficient is greater than a threshold if an AMT is performed based on the AMT flag, wherein the AMT index is obtained when the number of non-zero transform coefficient is greater than the threshold.

4. The method of claim 1, wherein performing the inverse transform comprises applying an inverse transform of the DST-7 or an inverse transform of the DCT-8 to each row after applying the inverse transform of the DST-7 or the inverse transform of the DCT-8 to each column if the vertical transform or the horizontal transform is the DST-7 or DCT-8.

5. The method of claim 1, wherein the vertical transform or the horizontal transform is differently applied to each row and/or each column.

6. The method of claim 1, wherein an AMT flag or the AMT index is defined in at least one level of a sequence, a picture, a slice, a block, a coding unit, the transform unit or a prediction unit.

7. A method of encoding a video signal based on adapt multiple transforms (AMT), the method comprising:

deriving a transform combination being applied to a transform unit, wherein the transform combination is configured with a horizontal transform and a vertical transform and includes at least one of discrete sine transform type 7 (DST-7) or discrete cosine transform type 8 (DCT-8);

performing a transform on the transform unit based on the transform combination; generating an AMT flag, wherein the AMT flag is used for representing whether the AMT is performed; and determining one transform configuration group of a plurality of transform configuration groups based on a prediction mode, wherein each of the plurality of transform configuration groups includes a plurality of transform combinations;

generating an AMT index corresponding to the transform combination based on the AMT being performed, the AMT index (i) indicating any one of a plurality of transform combinations of the one transform configuration group of the plurality of transform configuration groups, (ii) being a single transform index corresponding to a first index value for a horizontal transform and a second index value for a vertical transform, and (iii) being comprised of values of 0, 1, 2, 3, 4, wherein the first index value and the second index value are determined based on the AMT index and the one transform configuration group, wherein a matrix for the transform is derived based on a type of the transform combination and a size of the transform unit being 32 or less.

8. A non-transitory computer-readable medium storing picture information generated by performing the steps of:

deriving a transform combination being applied to a transform unit that is configured with a horizontal transform and a vertical transform and that includes at least one of discrete sine transform type 7 (DST-7) or discrete cosine transform type 8 (DCT-8);

performing a transform on the transform unit based on the transform combination;

generating an adaptive multiple transforms (AMT) flag that is used for representing whether an AMT is performed; and determining one transform configuration group of a plurality of transform configuration groups based on a prediction mode, wherein each of the plurality of transform configuration groups includes a plurality of transform combinations;

generating an AMT index corresponding to the transform combination based on the AMT is performed, the AMT index (i) indicating any one of a plurality of transform combinations of the one transform configuration group of the plurality of transform configuration groups, (ii) being a single transform index corresponding to a first index value for a horizontal transform and a second index value for a vertical transform, and (iii) being comprised of values of 0, 1, 2, 3, 4, wherein the first index value and the second index value are determined based on the AMT index and the one transform configuration group, wherein a matrix for the transform is derived based on a type of the transform combination and a size of the transform unit being 32 or less.

* * * * *

UNITED STATES PATENT AND TRADEMARK OFFICE
CERTIFICATE OF CORRECTION

| | |
|---|---|
| PATENT NO. | : 11,277,640 B2 |
| APPLICATION NO. | : 16/781416 |
| DATED | : March 15, 2022 |
| INVENTOR(S) | : Moonmo Koo |

It is certified that error appears in the above-identified patent and that said Letters Patent is hereby corrected as shown below:

In the Claims

In Column 29, Line 37 Claim 7, "adapt" should be changed to --adaptive--.

Signed and Sealed this
Fourteenth Day of June, 2022

*Katherine Kelly Vidal*

Katherine Kelly Vidal
*Director of the United States Patent and Trademark Office*